(12) United States Patent
Bettinger, II et al.

(10) Patent No.: US 8,595,116 B1
(45) Date of Patent: Nov. 26, 2013

(54) SYSTEM AND METHOD FOR SETTING UP AND MANAGING RETIREMENT ACCOUNTS OF ETFS AND INDEX MUTUAL FUNDS

(75) Inventors: Walter W Bettinger, II, Menlo Park, CA (US); Paul Ergh, Copley, OH (US)

(73) Assignee: Charles Schwab & Co., Inc., San Francisco, CA (US)

( * ) Notice: Subject to any disclaimer, the term of this patent is extended or adjusted under 35 U.S.C. 154(b) by 0 days.

(21) Appl. No.: 13/329,208

(22) Filed: Dec. 16, 2011

Related U.S. Application Data

(60) Provisional application No. 61/459,746, filed on Dec. 16, 2010.

(51) Int. Cl.
*G06Q 40/00* (2012.01)

(52) U.S. Cl.
USPC .......................................................... 705/36

(58) Field of Classification Search
USPC ................................................... 705/36 R, 36
See application file for complete search history.

(56) References Cited

U.S. PATENT DOCUMENTS

| 7,949,592 | B1 * | 5/2011 | Oros ......................... 705/36 R |
| 2005/0010516 | A1 * | 1/2005 | Ivanov et al. .................. 705/36 |
| 2009/0024478 | A1 * | 1/2009 | Dixon et al. ................... 705/14 |

* cited by examiner

*Primary Examiner* — Jessica Lemieux
(74) *Attorney, Agent, or Firm* — Innovation Partners; Charles E. Gotlieb

(57) ABSTRACT

A system and method uses a record keeping system, broker-dealer system and a bank system to provide retirement accounts that include one or more ETFs, or other index funds such as index mutual funds in one or more plans. An asset allocator defines the investment options under each plan.

12 Claims, 8 Drawing Sheets

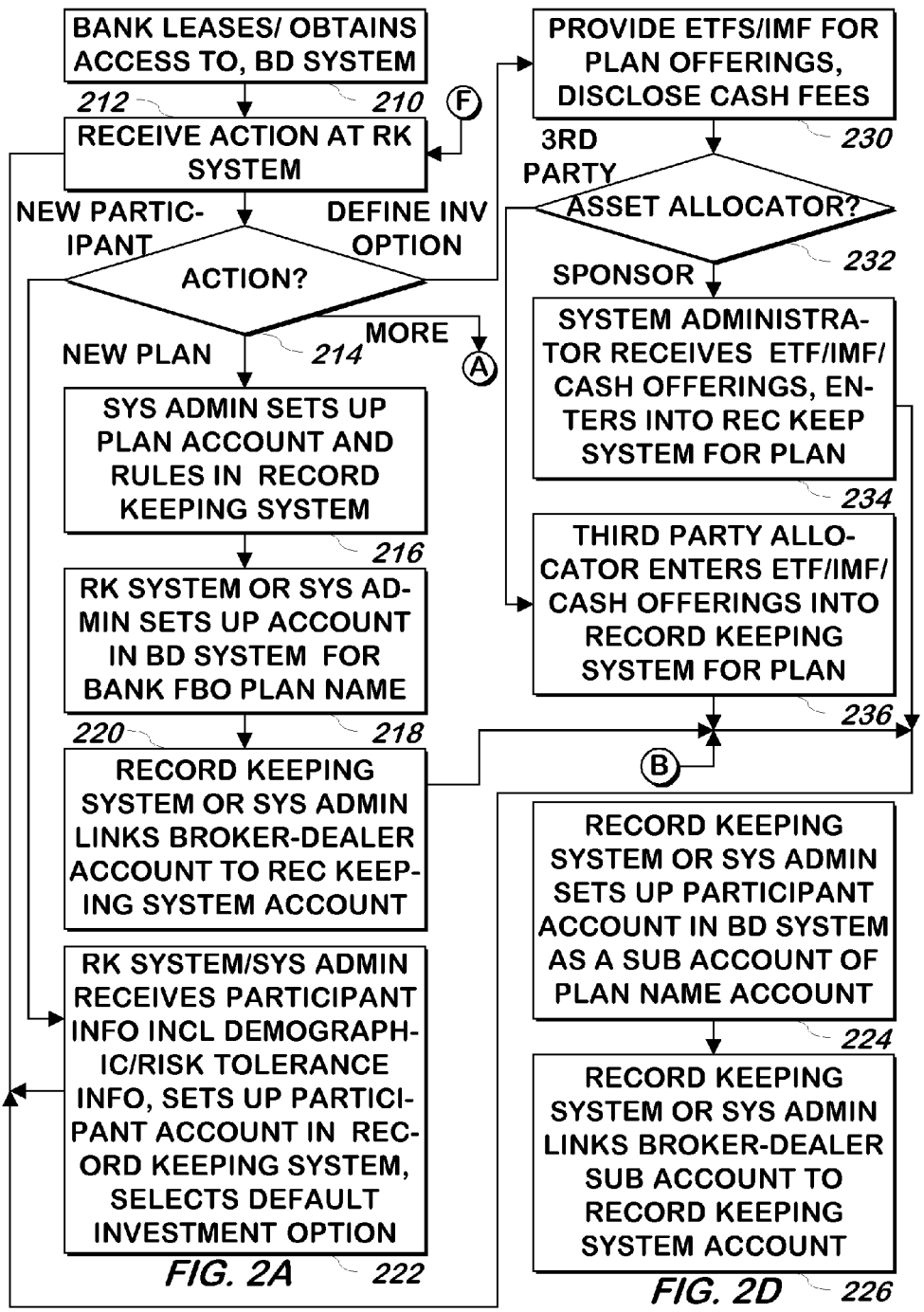

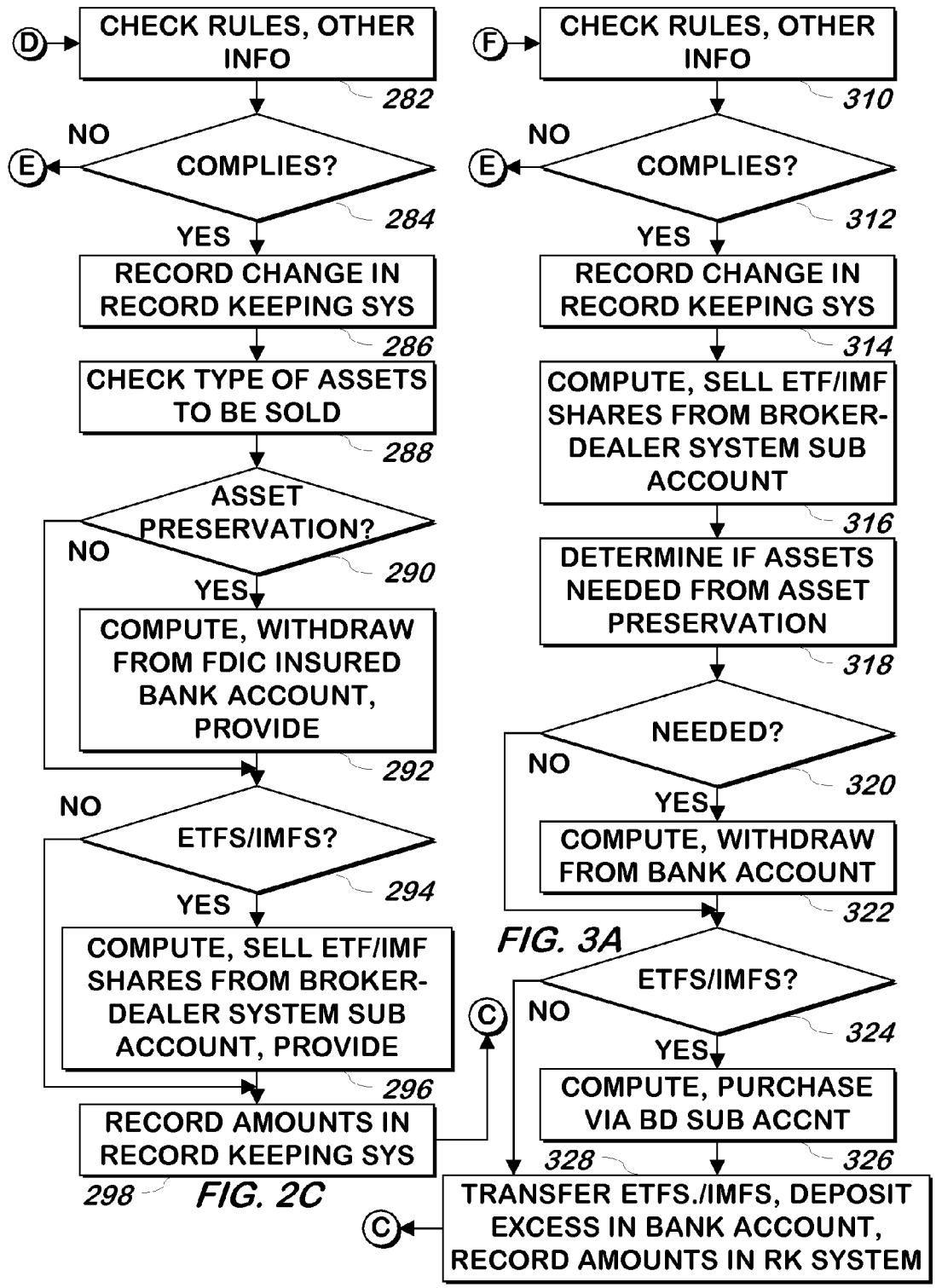

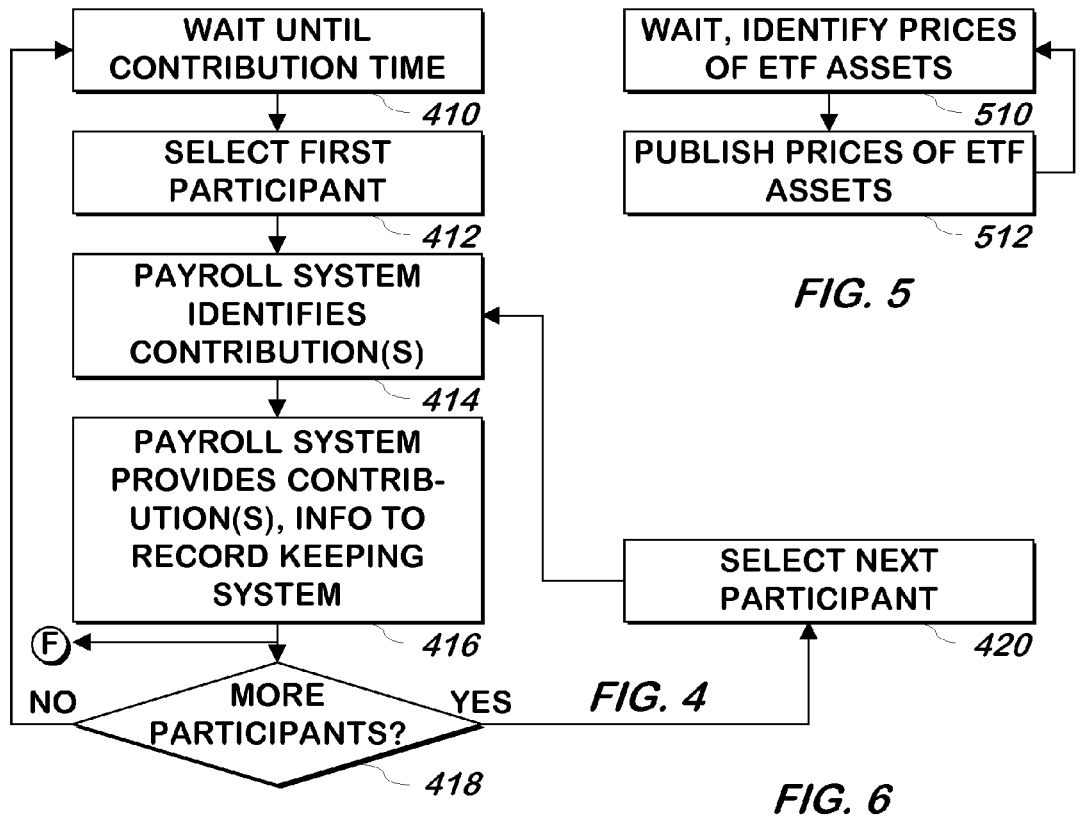
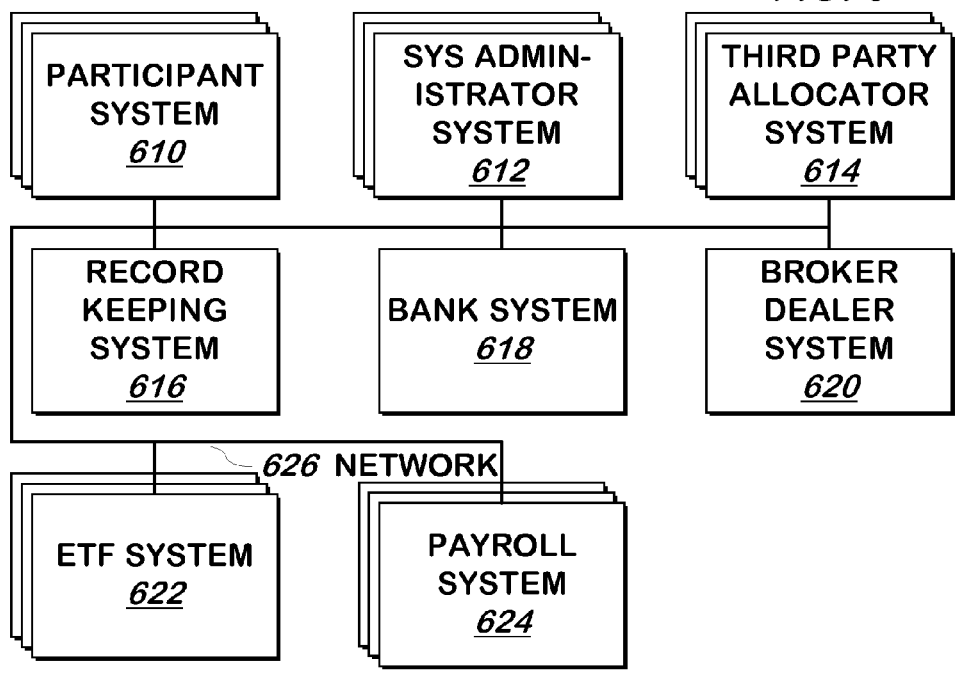

SYSTEM AND METHOD FOR SETTING UP AND MANAGING RETIREMENT ACCOUNTS OF ETFS AND INDEX MUTUAL FUNDS

RELATED APPLICATION

This application claims the benefit of U.S. Provisional Patent Application Serial No. 61/459,746 entitled, "Method and Apparatus for Setting Up and Managing Retirement Accounts of ETFs" filed on Dec. 16, 2010 by Walter Bettinger, Gary Shrader and Paul Ergh, having the same assignee as the present application and is hereby incorporated by reference in its entirety.

FIELD OF THE INVENTION

The present invention is related to retirement accounts and more specifically to retirement accounts using non-actively managed funds, such as index mutual funds and ETFs.

BACKGROUND OF THE INVENTION

Many retirement accounts such as accounts in 401(k) plans utilize actively managed mutual funds. 401(k) plans are those that are set up by a plan sponsor, such as an employer of a participant in the plan, and the participant can select from one or more investment options and have retirement funds automatically deposited from his or her paycheck into his or her selected investment option or options under the plan. Retirement funds may be contributed from an employee's paycheck, contributed by the employer, or both.

However, limiting retirement accounts to actively managed mutual funds can limit the potential gains the participants can make, because many actively managed mutual funds cost much more to manage than exchange traded funds, known as "ETFs" or index mutual funds, referred to herein as "IMFs".

Investing in a single ETF or index mutual fund could be used to lower the costs and improve the return to investors, but such an investment option may not be appropriate for every investor, and may not maximize the potential returns available to an investor for a given level of risk.

If a new approach is employed, other problems may result. Transferring a large number of plan participants from one retirement plan structure to another can be difficult to implement, as the investment options under the old structure may not be the same as the investment options under the new structure. An attempt may be made to map investment options under an old structure to the closest of several investment options under the new structure, and then transfer plan participants investment options using the mapping, but there is no guarantee that plan participants have been appropriately assigned to investment options under the old structure, and the mapping may not be optimal for all investors who have elected any particular investment option.

Finally, the use of ETFs and other investments in retirement plans can raise the issue of how to handle fractional shares, because investments are typically purchased by dollar amount rather than by numbers of shares, resulting in the need to purchase fractional shares. When the plan participants' transactions don't equal a whole number of shares, a fractional share may be purchased or sold, but fractional shares may be expensive or impossible to trade.

What is needed is a system, method and product that has the potential to reduce costs of investing, that can identify an investment option for a new plan participant, and that can handle fractional shares in a cost effective manner.

SUMMARY OF INVENTION

A system and method uses a record keeping system, broker-dealer system, a bank system, and a trust system to provide retirement accounts that include one or more ETFs in one or more investment options. In one embodiment, account is opened on the broker dealer system, and plan participants buy and sell assets in the plan using subaccounts of the plan account in the broker dealer system that each correspond to each participant of that plan. In another embodiment, an account is opened on the broker dealer system for each plan or for all plans and no subaccounts are employed, instead all trades are made via the plan account or the one plan account for all plans. In all cases, the record keeping system maintains the ownership of the plan participants of the assets bought or sold.

Various actions may be performed. Actions may include setting up a new plan, defining or changing the investment options under the plan, adding a new participant, receiving an election to one or more investment options, receiving a contribution for a participant, changing investment options or the proportion of investment options to which contributions should be made for a participant, receiving a request to sell assets in a plan and receiving a request for a participant's balance in a plan or a share price in an investment option.

The definition or changing of the investment options under the plan may be performed by an asset allocator. The asset allocator may select a mix of investments and an asset preservation option (e.g. an interest bearing bank account). The investments may be selected from, and optionally limited to, non-actively managed funds such as ETFs and index mutual funds. The fees paid to the asset allocator may be less than the fees paid to a manager of an actively managed fund, allowing a higher return to the plan participants for the same risk.

The asset allocator may define different investment options that are tailored for different plan participants.

For example, one investment option may be tailored to plan participants with a high tolerance for risk, another may be tailored to plan participants with a low tolerance for risk, and still others may be tailored for plan participants with risk tolerances in between. The asset allocator can identify characteristics of plan participants for which each investment option is most suited. When a new plan participant is registered, the plan participant can supply values of characteristics (e.g. 25 is the value of an age characteristic for a 25 year old plan participant), and the system and method can match that plan participant to the investment option most closely matching that plan participant's characteristic values, and suggest that investment option as the default into which assets of that participant from an old plan will be transferred. The plan participant can do nothing at that point, and all contributions made by, or on behalf of, that participant will be made into the default investment option for that plan participant. This will include a contribution which may include funds being transferred from a plan for which the participant was also a participant. If the participant does not want to accept the default, in one embodiment, the plan participant may act as his own asset allocator and define a plan of his own choosing, selected from ETFs, index mutual funds (which may be the same ones from which a third party asset allocator may select), the asset preservation option and stock in the company for which the participant works.

A pool of a few shares of each ETF, index mutual fund or both that are allocated to any investment option may be maintained by the bank, either held on its own behalf, held in trust for the various plans administered using the system and method of the present invention, or held in trust for each plan, or by a different bank or a broker dealer. When fractional shares are traded for a participant, buy trades are rounded up to the nearest whole share and sell trades are either rounded down or rounded up, with any needed fractions coming from the pool, and any excess fractions being placed into the pool. The party holding such pooled shares may maintain the pool by selling excess shares if the number of shares held by the pool in an ETF or index mutual fund exceeds a threshold or buying additional shares if the number of shares held in an ETF or index mutual fund falls below the same or a different threshold.

BRIEF DESCRIPTION OF THE DRAWINGS

FIG. 4 is a flowchart illustrating a method of operating a set of retirement account plans such as a 401K plans of various businesses, according to one embodiment of the present invention.

FIG. 5 is a flowchart illustrating a method of pricing ETFs according to one embodiment of the present invention.

FIG. 6 is a block schematic diagram of a system for operating one or more retirement plan investment options that include ETFs that are quoted or priced at multiple times during the trading day according to one embodiment of the present invention.

DETAILED DESCRIPTION OF A PREFERRED EMBODIMENT

Figure 1:
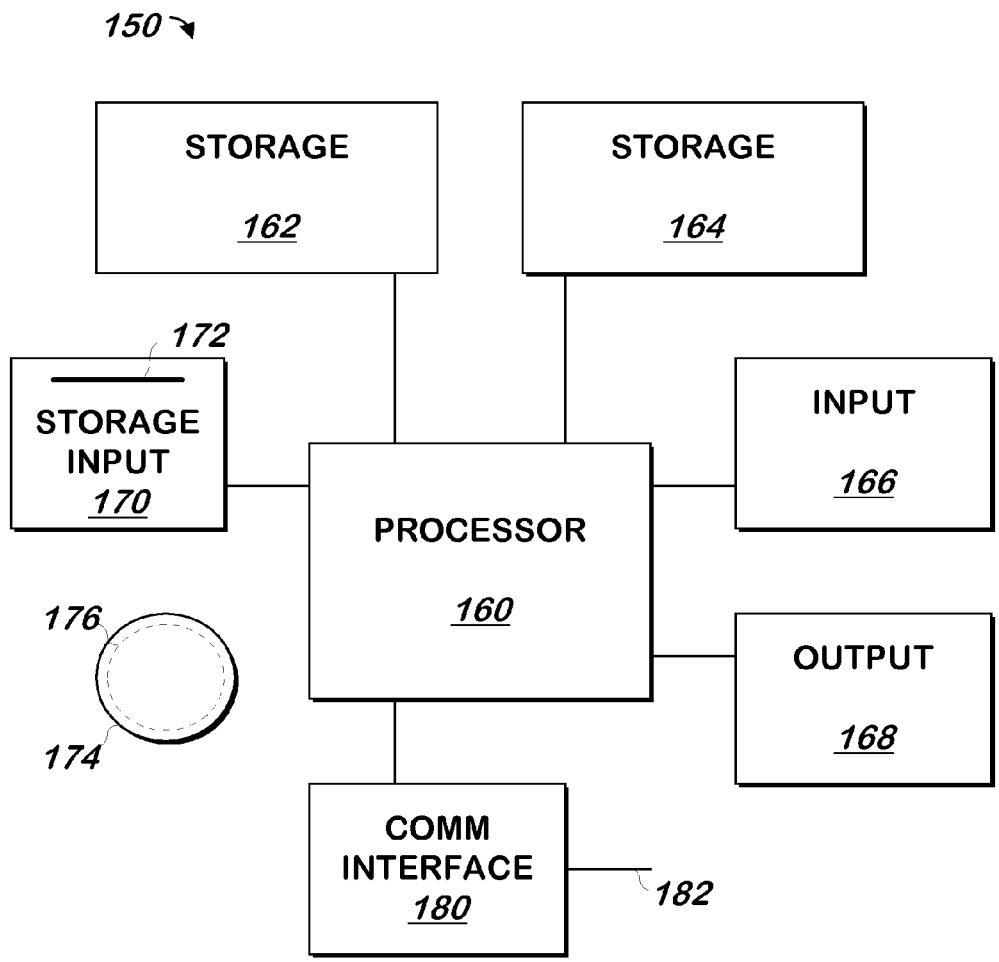
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS SPARC ENTERPRISE M9000 SERVER running the SOLARIS operating system commercially available from ORACLE CORPORATION of Redwood Shores, Calif., a PENTIUM-compatible personal computer system such as are available from DELL COMPUTER CORPORATION of Round Rock, Tex. running a version of the WINDOWS operating system (such as XP, 7 or Vista) commercially available from MICROSOFT Corporation of Redmond Wash. or a Macintosh computer system running the MACOS or OPENSTEP operating system commercially available from APPLE INCORPORATED of Cupertino, Calif. and the FIREFOX browser commercially available from MOZILLA FOUNDATION of Mountain View, Calif. or INTERNET EXPLORER browser commercially available from MICROSOFT above, although other systems may be used. Each computer system 150 may be a DROID 2 mobile telephone commercially available from MOTOROLA CORPORATION of Schaumberg, Ill. running the ANDROID operating system commercially available from GOOGLE, INC. of Mountain View, Calif. Various computer systems may be employed, with the various computer systems communicating with one another via the Internet, a conventional cellular telephone network, an Ethernet network, or all of these.

Figure 2B:
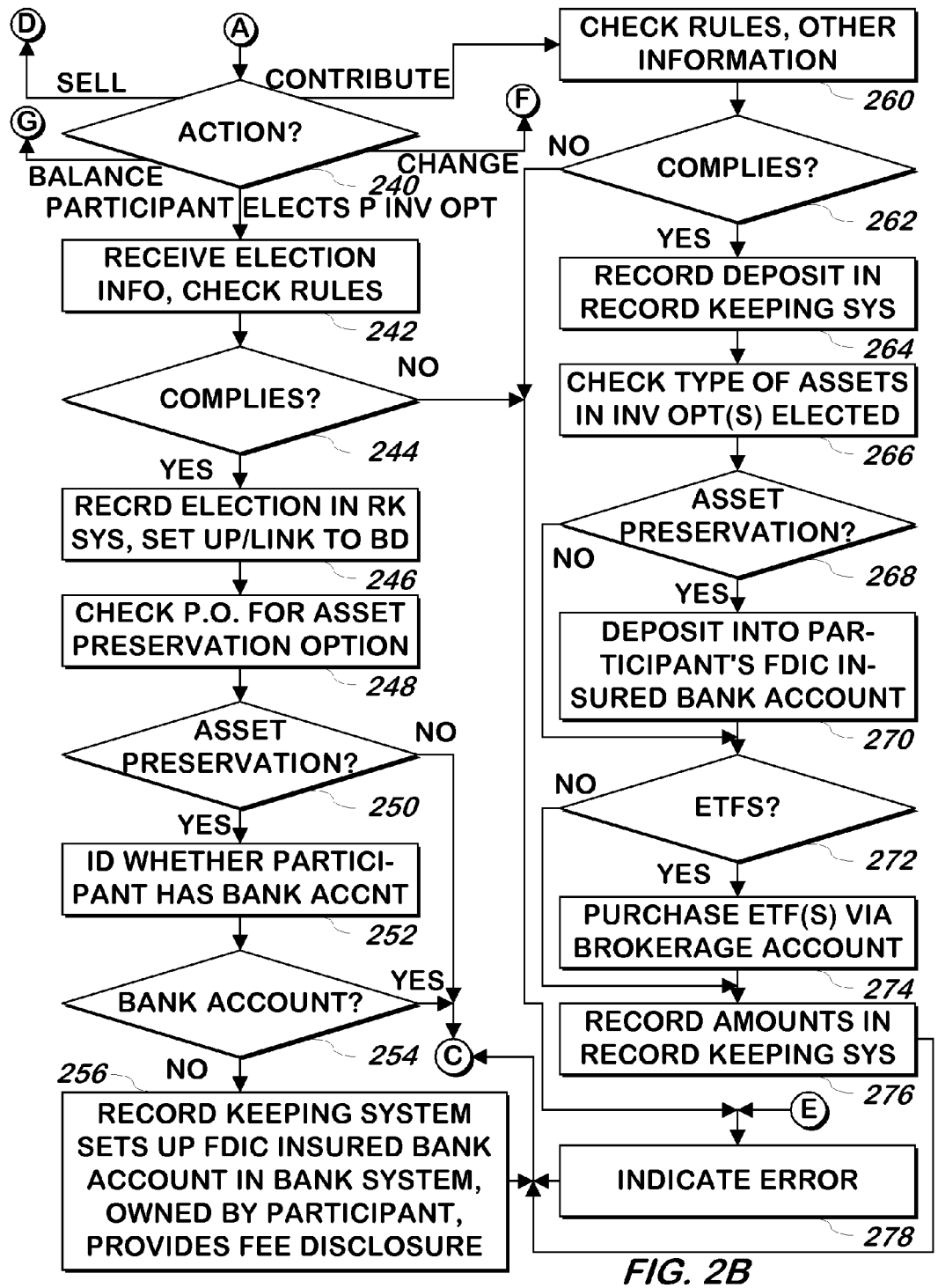
FIG. 2, consisting of FIGS. 2A, 2B, 2C and 2D, FIGS. 3A and 3B

Referring now to FIG. 2, consisting of FIGS. 2A, 2B, 2C, 2D, 3A, 3B and 4, a method of operating retirement plans, such as plans from different companies, is shown according to one embodiment of the present invention.

Access to a broker-dealer system is obtained by a bank 210. A "broker dealer system" is a system operated by a broker dealer in compliance with government regulations applicable to the transactions described herein. A "bank" is a financial institution in which accounts are insured by the FDIC, NCUA or other similar insurance entity.

An action is received by a record keeping computer system 212. In one embodiment, the record keeping computer system, referred to as the record keeping system, is a computer system operated by or on behalf of the bank or a different entity. The action may include receiving an indication to initiate or make a change to a retirement plan (e.g. by adding a plan or adding a participant to a plan or any of the other actions described herein), and the action includes receiving conventional information associated with such initiation or change, or information required to effectuate such initiation or change.

If the action is a request to set up a new plan 214, a system administrator or the plan administrator sets up a plan account and plan rules in the record keeping system 216. A system administrator works for the entity that operates the record keeping system, or the bank system, or for the entity or one of the entities on whose behalf such system is operated. A plan administrator may work for the company whose employees may participate in the plan or for a third party acting on behalf of such company. Setting up a plan account may involve supplying the name of the company and a tax identifier, plan rules, and other conventional information required to set up a retirement plan such as a 401(k) plan, including information about setting up accounts under the plan. As described herein, when something is provided to a system, it is received and stored by that system, thus, such information is received and stored by the record keeping system.

Plan rules may include per contribution limits or annual limits to contributions that may be made under the plan, contribution eligibility information, such as length of employment, maximum age, etc., vesting information and other conventional plan rule information.

In one embodiment, plan rules include an option to allow a plan participant to directly (e.g. not through an ETF or IMF) invest in the stock or other investments of one or more companies, such as the company that employs the plan participants, as described in more detail below. The identifiers of the allowed direct investments are received as part of the plan rules.

The record keeping system or the system administrator or plan administrator sets up an account for the plan in the broker-dealer system 218, which may be a computer system coupled to the record keeping system via a network. The broker-dealer system account is set up so that assets in the account in the broker-dealer system will be registered by the bank, trustee, or other party as trustee or custodian for the benefit of the plan. In one embodiment, setting up a plan includes providing by the record keeping system to the party setting up the plan or vice versa, an identifier that can be used to identify the plan. The identifier may be the name of the plan and the tax identifier of the company, though other identifiers may be used. The record keeping system stores the plan identifier associated with the plan, and uses it to link things to the plan as described herein. In one embodiment, all links may be two way links, so that if account A is linked to account B, account A is linked to account B and account B is linked to account A. Linkages may be made via any unique identifier of the items being linked. The record keeping system or the system administrator links the broker-dealer account set up above with the record-record keeping system account also set up above 220. The method continues at step 212.

Once a plan has been defined, any number of investment options for the plan, referred to as an "investment option", may be defined. In one embodiment, the investment option is defined via the record keeping system via an action. If the action at the record keeping system received at step 212 is an indication to define an investment option for a plan, a list of exchange traded funds for investment options is provided, any eligibility or contribution rules may be received, and cash fees may be optionally disclosed 230.

As described herein, exchange traded funds are used in investment options exclusively, along with an asset protection option. However, in one embodiment, exchange traded funds or index mutual funds or both may be used. Index mutual funds are mutual funds that track an index or a combination of indices: they are not actively managed. In one embodiment, only ETFs and IMFs are available for use in an investment option, along with an asset protection option in the form of a bank account or the like, by a third party asset allocator.

The cash fees may include fees taken from investment options that utilize an asset protection option available to plans in the form of an FDIC insured bank account, such as a savings account or interest bearing checking account. In one embodiment, all investment options use such an asset protection option. Cash fees may have any of a number of sources, including fees provided to a third party asset allocator, fees paid to the fund for administration and/or other purposes.

In one embodiment, investment options are defined by an asset allocator, which may be a representative of the plan sponsor or may be a third-party asset allocator. If the asset allocator is the plan sponsor 232, a system administrator receives the proportion of ETF or ETF's (and one or more IMFs as noted above) and asset protection offerings for each investment option, along with an investment option identifier and eligibility rules, and stores such information into the record keeping system, associated with the plan 234. Such information may be entered by the plan administrator, a person who works for the plan sponsor. The record keeping system stores such information associated with the plan identifier as part of step 234. The method continues at step 212.

If the asset allocator is a third-party 232, a third-party allocator enters the proportion of ETF's and asset protection option (e.g. an interest bearing bank account) for the investment option from the ETF offerings described above and any eligibility rules into the record keeping system for the plan, and the plan identifier, and the record keeping system stores such information associated with the plan identifier 236. The method continues at step 212.

In one embodiment, any number of investment options may be defined for each plan. In one embodiment, for each investment option the asset allocator may specify values or ranges of values of characteristics of users for which that investment option is the best fit from among the other investment options that are or will be defined for the plan. Characteristics may include demographic characteristics, risk tolerances, and other retirement planning variables such as number of years to retirement and amount of retirement funds needed or desired.

Once one or more investment options have been set up as described above, a participant may be added to the plan, via an action performed at the record keeping system. If the action received at the record keeping system in step 212 is the receipt of a request to add a new participant to a plan 214, the method continues at step 222. At step 222, the record keeping system or a system administrator receives participant information, such as the name and Social Security number of the new participant, as well as the name of one or more existing plans set up as described above. The record keeping system or the system administrator sets up a participant account in the record keeping system with the received information and links the participant account to the plan account for the plan specified 222. The method continues at step 212.

In one embodiment, the participant supplies characteristic values, such as age, number of years to retirement, or other demographic information, tolerance for risk, retirement funds needs and other conventional retirement planning information along with the other information supplied above in step 222. Supplying the values may be done directly, for example, by entering an age, and indirectly, for example, by answering questions from which the participant's tolerance for risk may be inferred.

In one embodiment, once a participant has been set up, as part of step 222, a default investment option is selected for that participant by scoring the characteristic values for the participant against the characteristic values or ranges of characteristic values supplied by the asset allocator for each of the investment options corresponding to the plan to which the participant was added and identifying the investment option with the highest score.

In one embodiment, the default investment option is considered to be the investment option elected by the participant unless the participant selects a different investment option.

In one embodiment, the participant may elect any investment option defined for the plan as described above. If the action received in step 212 is the receipt of an indication that the participant wishes to elect an investment option 240, election information may be received and rules associated with the plan or investment option may be checked. In one embodiment, election information may include an amount or proportion of a contribution that should be automatically provided to the plan being elected and any other plans already elected 242. Rules may be checked against other information (e.g. the current date, the participant's age, etc.) to ensure the participant is eligible to participate in the plan and offering, and the participant's election is within the plan rules as part of step 242. If the participant or the election do not meet the rules 244, an explanation of the error is provided to the participant 278, and the method continues at step 212. If the participant and the election meet the rules 244, such election information received as described above is recorded in the record keeping system, and an account is set up in the broker dealer system for the participant and linked to the participant's account in the record keeping system 246.

In one embodiment, if the participant elects an investment option, that investment option will supersede the default investment option. In one embodiment, if the participant elects a different investment option, the participant may define his or her own investment option as described above and then elect the one he or she has defined. The investment option may be defined using the same ETFs or IMFs and asset protection option available to an asset allocator as described above, but may also include the securities of the company defined under the plan as described above. In one embodiment, investment options other than the default investment option are not available to a plan participant unless the plan participant specified the investment option himself or herself or had his or her own investment advisor specify it.

In one embodiment, setting up and linking the account in the broker dealer system is described in more detail with reference to FIG. 2D. Referring momentarily to FIG. 2D, the record keeping system or a system administrator sets up 224 an account for the participant at the broker dealer system as a sub account of the account for the plan corresponding to the user and set up as described herein, and then links 226 that account to the account in the participant's account in the record keeping system.

Referring again to FIG. 2B, the plan allocation of the elected investment option may be checked to determine if an asset preservation option is part of that investment option 248. In one embodiment, all plans contain an asset preservation option. If the investment option does not contain an asset preservation option 250, the method continues at step 212. Otherwise 250, the record keeping system determines whether the participant has a bank account 252, for example by looking to see if one is linked to the participant's account in the record keeping system. If the participant has a bank account 254, the method continues at step 212. Otherwise 254, the record keeping system sets up an FDIC insured bank account in a bank computer system, the account being owned by the participant, links it to the participant's account in the record keeping system, and provides disclosure of the fees to the participant. The method continues at step 212.

At any time, a contribution may be received for a participant. If such a contribution is received, it will be received with an amount and an identifier of the participant for whom the contribution is being received. Such a contribution may be received from a payroll system using funds deducted from the participant's paycheck, funds provided by the participant's employer or both. If such a contribution is received at the record keeping system 240, the rules for the plan and the investment option or investment options to which the participant has elected as described above, are checked along with contribution and other information 260 to determine if the contribution complies with the plan and investment option rules in light of the other information. For example, the other information may be the amount previously contributed to the plan during that plan year or calendar year, or all amounts contributed to all investment options elected by the participant during the calendar year. One rule may be that an amount for the contribution has been deposited into an account at the bank for the company, and such a deposit is checked to ensure compliance with the rule.

If the other information does not comply with the rules for the plan or investment option or options elected by the participant 262, the method continues at step 278. The contribution may be deposited into the bank account linked to the record keeping account of the participant, and if no such account exists, one is set up and linked to the participant's record keeping account as described above, or otherwise held for the participant as part of step 278.

If the contribution, optionally in light of the other information, complies with the rules for the plan and all of the investment options elected by participant 262, the amount of the contribution is recorded as a deposit in the record keeping system 264. The type of assets in the investment option or options elected by the plan participant are checked to determine whether an asset preservation option is part of the investment option or options elected.

If the investment option or options elected by the participant include an asset preservation option 268, the amount or amounts specified by the investment option allocation corresponding to the asset preservation option for the contribution are deposited into the participant's FDIC insured bank account 270, and the method continues at step 272. Otherwise 268, the method continues at step 272.

If the investment option or options elected by the participant include one or more ETFs 272, such ETF's are purchased via the brokerage account linked to the participant's record keeping account 274, in the amounts allocated to each ETF in each elected investment option via the proportion or amounts specified, and the assets held in each plan are recorded in the record keeping system 276. The method continues at step 212.

In one embodiment, if no investment options are elected by the participant, a default investment option is selected for the participant that is 100% allocated to an asset preservation option, and an FDIC insured bank account is opened on the bank system for the participant if the plan participant does not already have one or one of the proper type and linked to the participant's record keeping account as part of step 266.

At various times, a participant may withdraw funds from a retirement plan according to the rules of the plan and investment options from which funds are being withdrawn. If the action received is an indication that the participant wishes to withdraw funds from a plan 240, a specification of the amount of funds, the reason for the withdrawal and optionally the investment option or options from which the funds should be withdrawn are received as part of the action, and the method continues at step 282 of FIG. 2C. At step 282 of FIG. 2C, rules defined for the plan or investment option or options are checked against other information, such as the reason for the withdrawal, the participants age (using a date of birth that is provided as part of the information received as part of an action for a new participant) or the amount of any prior withdrawals stored in the record keeping system. If the withdrawal does not comply with the rules 284, the method continues at step 278. Otherwise 284, the withdrawal is recorded in the record keeping system 286 and the type of assets in the plan to be used for the withdrawal are checked 288. If the type of assets does not include an asset preservation option 290, the method continues at step 294. If the type of assets in the investment option to be used for the withdrawal includes an asset preservation option 290, the amount of the withdrawal is computed and that amount is withdrawn from the FDIC insured bank account and provided to the participant with any other funds described below 292. In one embodiment, providing funds to the participant is performed by transferring funds into an account specified as part of the withdrawal action. The method continues at step 294.

At step 294, if the type of assets to be withdrawn do not include one or more ETFs 294, the method continues at step 298 described below. Otherwise 294, the number or amount of shares of ETFs in the investment option or offerings may be computed based on the request for the withdrawal, and the corresponding amount or number of shares in the brokerage system subaccount of the participant are sold, and the funds from the sale are provided to the participant. The amount of funds from the FDIC insured or other bank account, if any, and the number of ETF shares sold as well as the amount of total funds provided are recorded in the record keeping system with the current date and the reason for the withdrawal 298, and the method continues at step 212.

As described herein, subaccounts of a plan account at the broker dealer system are used to make trades. In another embodiment, no subaccounts are used, and only the plan account is used to trade securities. The record keeping system keeps track of ownership of assets under the plan. In still another embodiment, a single broker dealer account is used to trade securities for all plans, with the record keeping system again being used to keep track of assets in plans and in the accounts of the plan participants As described herein, as funds are being transferred in or out of an investment option, the funds are transferred into or out of ETFs and optionally a bank account as defined by the investment option as described above. In another embodiment, all funds are transferred into or out of a single bank account for each plan or a single bank account for all plans, with the record keeping system being used to track ownership of assets in the bank account or accounts.

In one embodiment, a participant may transfer funds between investment options at certain times as specified in the rules for the plan by providing an indication to the record keeping system, including the amount of funds to transfer, the investment option from which the funds are being transferred and the investment option to which the funds should be transferred. If the action received is an indication that the participant wishes to transfer funds between investment options 240, the name or other identifier of the participant, a specification of the amount of funds, the investment option from which the funds should be withdrawn and the investment option or investment options to which the funds should be invested, are received as part of the action, and the method continues at step 310 of FIG. 3A. At step 310 of FIG. 3, rules defined for the investment options are checked against other information, such as the current date to ensure it is within one or more windows of time in which such transfers are allowed, and an indication of whether the investment option into which the funds will be transferred is still open to additional funds or new participants (which may be checked via the information for the participant stored in the record keeping system). If the transfer does not comply with the rules for the plan or all investment options 284, the method continues at step 278. Otherwise 284, the transfer is recorded in the record keeping system 286 and the amount of ETF shares to be sold is computed and such shares are sold from the participant's broker dealer system sub account.

A determination is made 318 as to whether the plan being sold has an asset preservation option, and if so, whether funds from the asset preservation option are needed for the purchase of ETF shares in the new plan (for example, funds would not be needed if the percentage allocated to the asset preservation option were higher in the new investment option than the old investment option). If such funds are not needed 320, the method continues at step 324. If funds are needed 320, they are withdrawn from the participant's FDIC insured bank account or other account corresponding to the asset preservation option 322.

As part of step 322, determination is also made whether ETF shares are to be purchased in the investment option or options into which the investment is being made. If ETF shares will be purchased under the investment option being purchased 324, the amount of ETF shares to be purchased are computed and purchased 326 via the broker dealer sub account of the participant. In one embodiment, if some ETF or other shares are the same among the investment option being redeemed and being purchased, such ETF or other shares may be transferred from the redeemed investment option subaccount of the participant to the plan subaccount of the participant being purchased. Excess funds, if any from the sale of the ETF shares as described above are deposited into the participant's bank account, and all transactions (including any transfers) are recorded in the record keeping system, along with the current date. The method continues at step 212.

The participant may wish to obtain a balance of an investment option the participant owns, or may wish to obtain a share price of an investment option the participant does not own. The two cases are treated the same, as described below, except that the share price quotation request is handled as if the participant owned one share of the investment option. If the action received at step 212 is a balance or quotation request, the investment option is specified by the participant and received by the record keeping system and for a balance request, an identifier of the participant is also specified and received, and the method continues at step 350 of FIG. 3B.

Figure 3B:
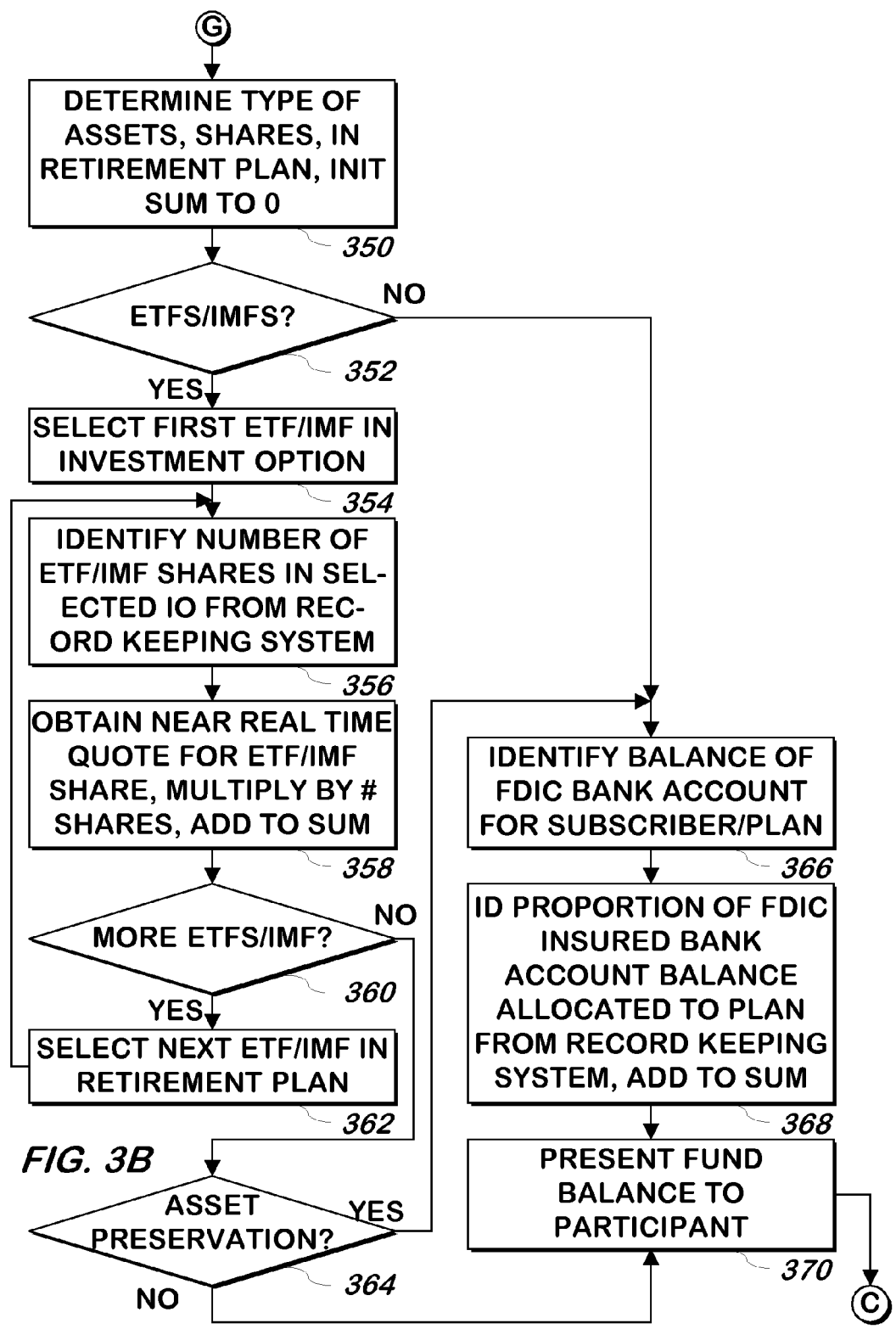

At step 350 of FIG. 3B, the type and proportion of assets per share in the investment option are identified, and the number of shares held by the participant are identified by the record keeping system, such information being maintained by the record keeping system as purchases and sales of investment options are made as described herein. For a quotation of an investment option held or not held by the participant, the number of shares held is considered to be 1 share. A sum is initialized to zero.

If there are no ETFs in the investment option 352, the method continues at step 366 and otherwise 352, the first ETF in the investment option is selected 354. The number of shares of the selected ETF corresponding to the number of shares in the investment option are identified by multiplying the number of shares held by the participant by the proportion (expressed as a percentage) of the assets of the investment option that are represented by the selected ETF 356. A real time or near real time quote (e.g. not one that always uses the prior end of trading day asset value) is obtained for the selected ETF and the quote is multiplied by the number of ETF shares described above and added to the sum 358.

If there are no more ETFs in the investment option 360, the method continues at step 364, and otherwise 360, the next ETF in the investment option specified by the participant is selected 362 and the method continues at step 356 using the newly selected ETF.

At step 364, if there is no asset preservation option for the investment option, the method continues at step 370. Otherwise 364, the portion of the FDIC insured bank account balance that corresponds to the investment option specified by the participant is identified and added to the sum 368 and the method continues at step 370.

At step 370, the sum representing the balance of the investment option (or share price) is provided to a participant system for display to the participant.

It is noted that, in one embodiment, the ETF quotations, purchases or sales described herein do not wait until the end of the trading day in which the action triggering any such purchase or sale occurs, nor do they use the price from the end of a prior trading day, but are instead executed or indicated rapidly at a price or at prices for the ETFs quoted nearly at the same time as the action, such as within a minute or few minutes throughout the trading day and use prices that are current (or prices very soon after) as of the time the trade is initiated or the quote is requested. The prices quoted or used for a purchase or sale are a function of the then current prices of the assets in the ETF. A commission or fee for the purchase or sale may be deducted from the ultimate price paid or received. However, the price quoted, paid or received by the participant will not be that of the prior end of trading day (as it would for the purchase or sale of a mutual fund) unless the participant purchases or sells an interest in the fund after the close of the prior trading day and before the start of the next one.

It is also noted that a non FDIC insured bank account may be used in place of the FDIC insured bank account.

In one embodiment, the record keeping system handles multiple participants working for multiple companies. Each company provides contributions for their employees who have elected to participate in at least one investment option, such as at payroll periods. The contributions may be provided via one or more payroll systems, the operation of each of which will now be described.

Referring now to FIG. 4, a payroll system waits 410 until a contribution time, which may be the time payroll to a company is made. The first participant for a company is selected 412 by the payroll system, for example, alphabetically. A retirement plan contribution amount for the selected participant is computed by the payroll system 414 using conventional techniques.

The payroll system provides 416 to an account at the bank the computed amount and provides to the record keeping system information about the contribution, such as an identifier of the participant, the amount and the date.

The information provided to the record keeping system may be the action for the contribution described above. If there are more participants 418, the next participant is selected 420 by the payroll system and the method continues at step 414 for the newly selected participant, and otherwise 418, the method continues at step 410.

Exchange traded funds are purchased and sold by purchasing a number of shares identified using a price per share that the ETF publishes frequently, such as every fifteen seconds. The price per ETF share is a function of the price of the assets each share represents. An ETF system provides the prices and such prices are used to buy and sell ETF shares as described herein. FIG. 5 illustrates a method of pricing ETF shares performed by an ETF system according to one embodiment of the present invention. Referring now to FIG. 5, a wait may occur until the end of an ETF pricing period, and the price of the ETF shares is computed using the value of the assets held by the ETF 510. The price is published 512 for use in buying and selling ETF shares and optionally in determining the allocation of ETFs in a plan and quotations of prices of shares of ETFs. The method continues at step 510.

Handling of Fractional Shares.

In one embodiment, trades of fractional shares of ETFs or other investments may be handled via a pool of shares that can be used to round trades up or down, by contributing any needed fractional shares to make the trade in a whole share, or by receiving a fractional share to make the trade in a whole share. In one embodiment, shares of funds bought are rounded up to the nearest whole share. Shares of funds sold may be rounded up in one embodiment, or rounded down in another embodiment. An account owned by the bank at which the one or more bank accounts described herein are held, or a different bank or a broker dealer, for itself or in trust on behalf of the various plans being administered for different companies, may be used to hold the ETF shares that are received. If two or more trades such as two or more buys are two or more sells of the same ETF or other investment are to be executed at or nearly at the same, time, they may be combined before the fractional amount is computed.

In one embodiment, ETFs and index mutual funds may be referred to herein as "non-actively managed funds". In one embodiment, a minimum and maximum amount of fractional shares of each non-actively managed fund that is defined in an investment option (in one embodiment, including participant-defined investment options) is held by the entity above for use in the pool. If the maximum is exceeded, the entity sells that fund and if the pool does not hold the minimum, the balance is purchased and placed in the pool.

Overview of Subsystems.

FIG. 6 is a block schematic diagram of the different subsystems used in accordance with the present invention as part of a system for managing retirement accounts containing ETFs. Each subsystem is described in greater detail below.

Each of several participant systems 610 includes a conventional computer system with a conventional browser coupled to a network 626 such as the Internet used by each of the participants. Participant system 610 is used by participants to communicate as described herein with record keeping system 616, which includes a conventional web server or other conventional computer system and includes a conventional database, and operates as described herein. Record keeping system 616 is also coupled to network 626. Each of one or more system administrator systems 612 includes a conventional computer system with a conventional web browser coupled to network 626 and is used by system administrators to communicate with record keeping system 616 as described herein.

Each of optional one or more third party allocator system 614 includes a conventional computer system with a web browser coupled to network 626 and is used by a third party allocator to communicate with record keeping system 616 as described herein.

Bank system 618 includes a conventional web server computer system including a conventional database coupled to network 626 and is used as described herein to maintain FDIC insured bank accounts or other bank accounts.

Broker dealer system 620 includes a conventional web server, including a conventional database and performs conventional broker-dealer activities including securities trading functions, for example, via a conventional stock exchange (not shown), ETF trading functions and other functions described herein, and is coupled to network 626.

Each of several ETF systems 622 are conventional computer systems such as conventional server systems including a conventional database coupled to network 626. Each ETF system 622 publishes prices of one or more ETFs that such ETF system 622 has calculated based on the price of assets held by one or more ETFs and may operate the ETFs in a conventional manner. An administrator supplies a list of the assets and the number of shares of one or more assets per ETF share (as well as cash holdings and number of ETF shares or other information that allows the cash per ETF share to be identified), and the ETF system 622 uses one or more conventional quotation systems for exchanges (not shown) to identify the share price of the ETFs for which ETF system 622 computes such share prices to allow contributions or other sources of funds to be used to purchase ETF shares, to identify the funds available from the sale of ETF shares, and to identify the value of a fund.

Each of several payroll systems 624 is a conventional employee payroll system coupled to network 626 and operated to pay employees and process payroll deductions such as deductions for retirement accounts as described herein.

The systems of FIG. 6 operate as described herein. In one embodiment a trust system (not shown) may also be used to monitor the actions of any or all of the other systems shown in FIG. 6.

Figure 7A:
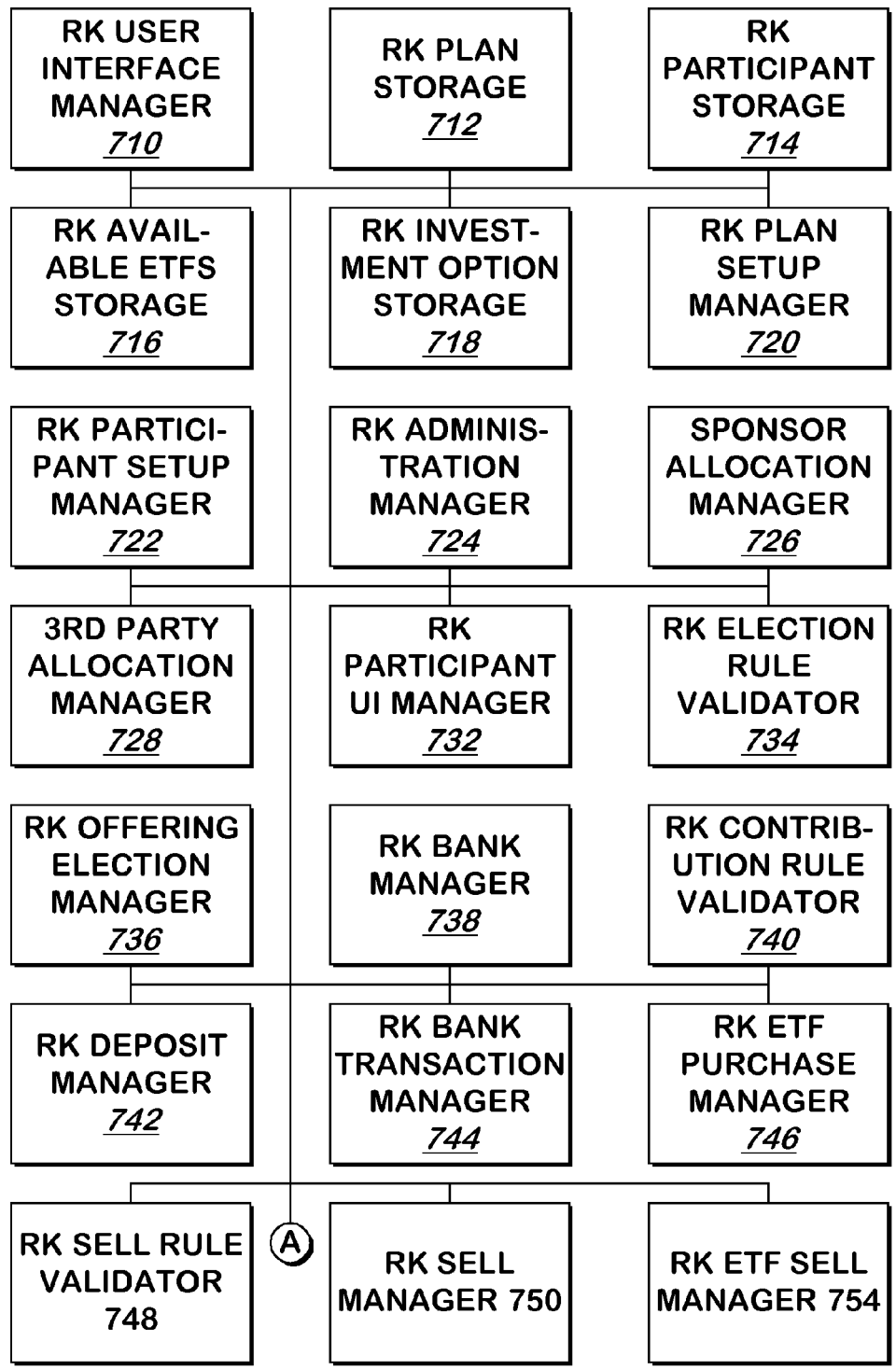
FIGS. 7A and 7B is a block schematic diagram illustrating a record keeping system of FIG. 6 in more detail according to one embodiment of the present invention.
Figure 7B:
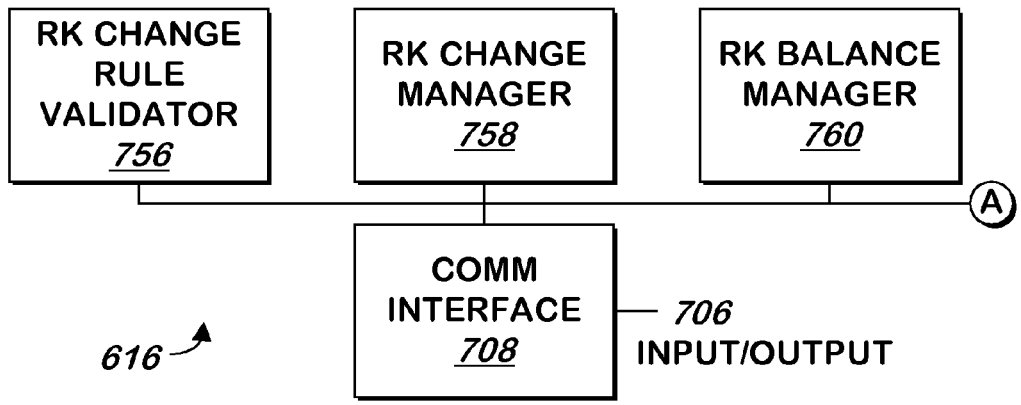
Figure 7C:
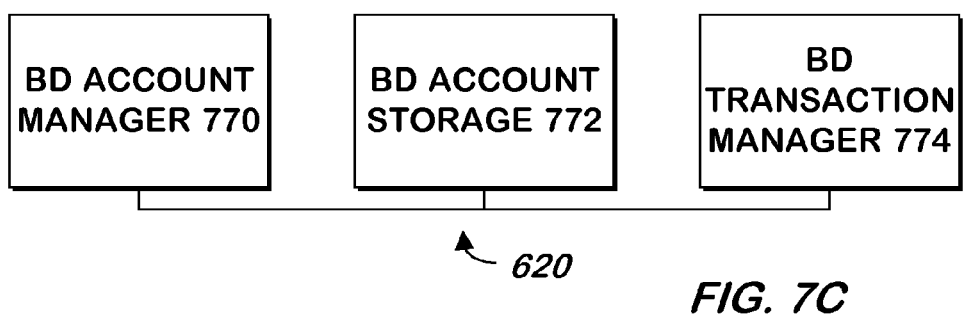
FIG. 7C is a block schematic diagram illustrating a broker-dealer system of FIG. 6 in more detail according to one embodiment of the present invention.
Figure 7D:
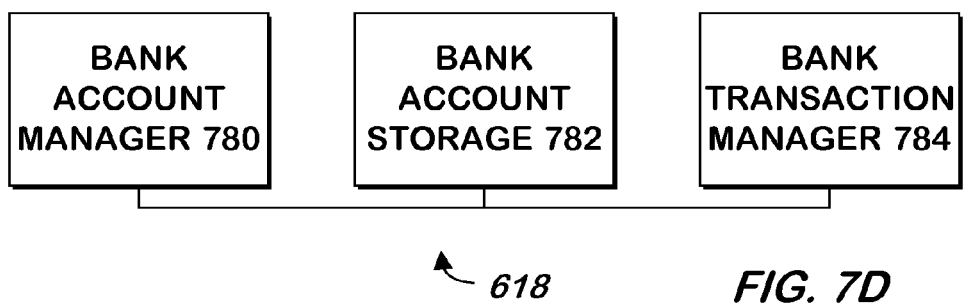
FIG. 7D is a block schematic diagram illustrating a bank system of FIG. 6 in more detail according to one embodiment of the present invention.

A representative record-keeping system 616 is shown in more detail according to one embodiment of the present invention FIGS. 7A and 7B. A representative broker-dealer system 620 is shown in more detail according to one embodiment of the present invention in FIG. 7C. A representative bank system 618 is shown in more detail according to one embodiment of the present invention in FIG. 7D. Each of these is shown in more detail according to one embodiment of the present invention. Referring now to FIG. 7, consisting of FIGS. 7A, 7B, 7C, and 7D, record keeping system 616 includes communication interface 708 which may include a conventional communication interface running suitable communication protocols, such as Ethernet, TCP/IP or both. In one embodiment, unless otherwise noted herein, all communications in and out of record keeping system 616 are made via input/output 706 of communication interface 708, said input/output 706 coupled to network 626, which may include a conventional Ethernet network, the Internet or both. Each of the systems 610-624 of FIG. 6 contain similar communication interfaces with a similarly connected input/output through which their respective communications are made using network 626. Record keeping user interface manager 710 provides a webpage, including one or more links to indicate one or more actions, such as a link to set up a new retirement plan, a link to define an investment option, a link to add a new participant to a retirement plan, and a link to access additional actions available to a participant of a retirement plan, all as described above.

Web pages are used as described herein; however, other embodiments may employ conventional application program user interfaces.

If a user, such as a system administrator working for an entity that operates the record keeping system, or the bank system, or for an entity or one of the entities on whose behalf such system is operated, or a plan administrator working for a company whose employees may participate in the plan or for a third party acting on behalf of such company, as described above, requests to set up a new plan, such as by clicking the new plan setup link on the webpage provided by record keeping user interface manager 710, record keeping plan setup manager 720 builds a web page containing suitable user interface elements that allow the user to provide plan account information and plan rules information, described above, and returns it to the user's browser in response. The user fills out the web page with conventional plan account information, such as the name of a company and a tax identifier, as described above, and the plan rules, such as any per contribution limits or annual limits to contributions that may be made by participants under the plan, as well as any contribution eligibility information, such as length of employment and maximum age information, as described above, and any other conventional information required to set up a retirement plan, such as a 401K plan. When record keeping plan setup manager 720 receives the plan account information and plan rules information, record keeping plan setup manager 720 stores such information associated with a unique record keeping (RK) plan identifier in record keeping plan storage 712. Record keeping plan setup manager 720 sends the RK plan identifier to broker-dealer account manager 770 along with a request to set up a broker-dealer account in the broker-dealer system with assets in the broker-dealer account being owned by the bank for the benefit of the plan, as described above. In one embodiment, record keeping plan setup manager 720 may provide any other information to broker-dealer account manager 770 that may be required to set up the broker-dealer account, such as the tax identifier of the record keeping company, or any other identifiers or information, as described above.

When broker-dealer account manager 770 receives the request from record keeping plan setup manager 720, broker-dealer account manager 770 sets up a broker-dealer account for the record keeping plan as requested and stores the broker-dealer account information in broker-dealer account storage 772 associated with unique a unique broker-dealer (BD) account identifier, as well as one or more identifiers corresponding to the record keeping company for which broker-dealer account manager 770 is setting up the account, such as the RK plan identifier and the tax identifier of the record keeping company, or any other identifiers or information. When broker-dealer account manager 770 has so stored the broker-dealer account identifier in broker-dealer account storage 772, broker-dealer account manager 770 sends the broker-dealer (BD) account identifier for the newly-opened broker-dealer account to record keeping plan setup manager 720 along with the RK plan identifier for which the broker-dealer account was set up.

Record keeping plan setup manager 720 receives the BD account identifier and stores the received BD account identifier in record keeping plan storage 712 associated with the RK plan identifier for which the BD account identifier was received.

At any time, the system administrator described above, or another user, may provide available ETF information, such as a list of exchange traded funds available for inclusion in one or more investment options, as described above. The user may provide such available ETF information, along with the RK plan identifier corresponding to the plan for which the ETFs are available, via a webpage built by record keeping administration manager 724 that contains suitable user interface elements to allow the user to enter one or more available ETFs, and returns the information to record keeping administration manager 724. Record keeping administration manager 724 receives and stores the available ETF information in record keeping available ETFs storage 716 with the RK plan identifier corresponding to the retirement plan for which the ETFs are available. In one embodiment, if any asset preservation options, described above, are provided by the user as options available to investment options, described above, record keeping administration manager 724 may also receive and store any asset preservation information, including any asset preservation fee information in record keeping available ETFs storage 716, such as any fees that are taken from investments that utilize an asset protection option in the form of an FDIC insured bank account, such as a savings account or interest bearing checking account.

When record keeping administration manager 724 has received and stored one or more available ETFs in record keeping available ETFs storage 716, a user, such as a system administrator for the system, or a plan sponsor of the company for which the investment option is being defined, or a third-party asset allocator or any other type of user, as described above, may request to define an investment option, such as by clicking a define investment option link on the webpage provided by record-keeping user interface manager 710. In one embodiment, the user provides the RK plan identifier corresponding to the record keeping plan for which the user would like to define the investment option, and the user may also provide an indication as to which type of user wishes to define the investment option, as described above.

In one embodiment, record keeping administration manager 724 may require the user, for example, a plan sponsor or a third-party asset allocator, to log in with a previously established username and corresponding password, or otherwise authenticate himself to the system in a conventional manner to define an investment option. In one embodiment, the user, for example, a system administrator, may already be authenticated to the system.

If a system administrator or a plan sponsor makes the request to define an investment option, record keeping administration manager 724 sends the request to define an investment option to sponsor allocation manager 726. If a third-party asset allocator makes the request to define an investment option, record keeping administration manager 724 sends the request to third-party allocation manager 728. In one embodiment, record keeping administration manager 724 issues a unique RK plan identifier for the plan, and sends the request to define an investment option to sponsor allocation manager 726 or third-party allocation manager 728 with the RK plan identifier corresponding to the plan for which the investment option is being defined.

When sponsor allocation manager 726 receives the RK plan identifier with the request to define an investment option, it retrieves any available ETFs information, such as the names of exchange traded funds that are available for investment options, along with any eligibility or contribution rules applying to such available ETFs, associated with the RK plan identifier in record keeping available ETFs storage 716. Sponsor allocation manager 726 builds a webpage to display the available ETFs information and contains suitable user interface elements to allow the user to provide investment option information, described above, and returns it to the user's browser in response. The user fills out the web page with the investment option information described above, such as the ETF name and corresponding ETF percentage, or proportion of an ETF to other holdings in the investment option, an asset preservation percentage, of any asset protection option to be included in the investment option, as described above, as well as any eligibility or contribution rules that apply to the investment option, and information allowing the assignment of the default investment options as described above. When sponsor allocation manager 726 receives the investment option information, sponsor allocation manager 726 stores such investment option information, including the ETF name(s) and corresponding ETF percentage(s), any asset preservation information and the eligibility or contribution rules of the investment option, in record-keeping investment option storage 718 associated with a unique investment option identifier, as well as the RK plan identifier corresponding to the plan for which the offering has been defined. Additionally, sponsor allocation manager 726 stores the investment option identifier in record keeping plan storage 712 linked to the RK plan identifier of the plan for which the investment option is defined.

In a similar manner, if a third-party asset allocator makes the request to define an investment option, record keeping administration manager 724 receives such a request and sends the request and RK plan identifier to third-party allocation manager 728, which receives the RK plan identifier and retrieves available ETFs information from record keeping available ETFs storage 716 in a manner similar to the manner in which sponsor allocation manager 726 receives and retrieves such information above.

Third-party allocation manager 728 displays the available ETF information in a manner similar to the manner in which sponsor allocation manager 726 displays available ETF information. In one embodiment, third-party allocation manager 728 may display the same list of available ETFs or it may display a different list of available ETFs as sponsor allocation manager 726, as described above. For example, third party allocation manager 728 may display more available ETFs to a third party asset allocator than sponsor allocation manager 726 displays to a plan sponsor. Third-party allocation manager 728 receives the investment option information from the user, including information allowing the assignment of the default investment options, and stores such information in record keeping investment option storage 718 and record keeping plan storage 712 in manner similar to the manner in which sponsor allocation manager 726 receives and stores such information above. Any number of users may request to define any number of investment options at any time, and sponsor allocation manager 726 and/or third-party allocation manager 728 may receive investment option information for any number of investment options for any number of record keeping plan accounts at any time. As noted, an asset allocator may select from non-actively managed funds such as index mutual funds and ETFs, and not just ETFs.

If the user requests to add a new participant to the record keeping plan account, such as by clicking a new participant setup link on the webpage provided by record keeping user interface manager 710, record keeping participant setup manager 720 builds a web page containing suitable user interface elements that allow the user to provide participant account information, described above, and returns it to the user's browser in response. The user fills out the web page with the participant account information, such as the name and Social Security number and characteristic values of the new participant and an RK plan identifier for the record keeping plan account, set up as described above, to which the participant is being added. In one embodiment, the user may establish with record keeping participant setup manager 722 a unique record keeping (RK) participant username and corresponding record keeping (RK) participant password that the new participant may subsequently use to log in to the system as described above and below. Record keeping participant setup manager 722 stores the participant account information, including the name, Social Security number, RK participant username and RK participant password, in record keeping participant storage 714 associated with a unique record keeping (RK) participant identifier, which may be the participant username or a unique participant account number or any other unique identifier, as well as the RK plan identifier corresponding to the record keeping plan to which the participant is added. Record keeping participant setup manager 722 assigns the participant a default investment option as described above using the characteristic values and the one or more characteristic values for each investment option stored in RK investment option storage 718 as described herein, and stores the default investment option with the other information received from the participant in record keeping participant storage 714. Record keeping participant setup manager 722 displays to the user the default investment option it identifies, and allows the user to define his or her own investment option if the user does not wish to use the default investment option. In one embodiment, such an investment option is specified by the user to a system administrator who enters it into sponsor allocation manager 726 as described above, and adds the participant's user identifier to the investment option, and sponsor allocation manager 726 stores the investment option into record keeping investment option storage 718 and assigns it to the participant in record keeping participant storage 714 by substituting an identifier of the newly created investment option in place of an identifier of the default investment option stored associated with the participant by record keeping participant setup manager 722.

Once a participant has been added to the record keeping plan as described above, the participant, or participant, may log in to record keeping participant user interface manager 732 at any time using the RK participant username and corresponding RK participant password established as described above. When the participant has logged on to record keeping participant user interface manager 732, the participant may request a number of actions, such as requesting to elect to investment options, making contributions to investment options to which the participant is elected, selling shares of, or withdrawing funds from, investment options to which the participant is elected, changing the investment options to which the participant is elected, and any other participant actions, as described above.

If the participant requests to elect investment options, such as by clicking an elect to investment options link on the on the webpage provided by record keeping participant user interface manager 732, record keeping participant user interface manager 732 builds a web page containing suitable user interface elements that allow the user to provide investment option election information, described above, and returns it to the user's browser in response. The participant fills out the web page with the investment option election information, including the investment option identifier for any number of investment options to which the user would like to elect, and the election amount corresponding to each investment option identifier, or the proportion of the participant's retirement funds allocated to that investment option election within the participant's retirement plan, as described above. When record keeping participant user interface manager 732 receives the investment option election information, it sends the investment option election information to record keeping election rule validator 734, along with the RK plan identifier that corresponds to the record keeping plan account under which the investment option election(s) are defined and the RK participant identifier that corresponds to the record keeping participant that is requesting to elect to the investment option(s).

Record keeping election rule validator 734 receives the investment option election information, RK plan identifier and RK participant identifier from record keeping participant user interface manager 732 and validates the investment option election information by determining if the participant is eligible to participate in the plan and investment option(s) elected to, as described above, and determining if the investment option election(s) and investment option election amount(s) comply with all the rules associated with the plan and investment option, as described above. In one embodiment, record keeping election rule validator 734 retrieves any participant information that corresponds to the RK participant identifier from record keeping participant storage 714, retrieves any plan rules that correspond to the received RK plan identifier from record keeping plan storage 712, and retrieves any investment option rules that correspond to the received investment option identifier(s) from record keeping investment option storage 718. If record keeping election rule validator 734 determines that the investment option election(s) do not comply with one or more record keeping plan or investment option rules, it sends an error message to record keeping participant user interface manager 732, which displays the error message, or an explanation of the error message, or both, to the participant as described above.

If record keeping election rule validator 734 determines that the offering election(s) comply with all rules that apply to the participant and the record keeping plan and record keeping investment options elected to by the participant, as described above, record keeping election rule validator 734 sends the RK participant identifier, RK plan identifier and investment option identifier for each investment option election to record keeping offering election manager 736.

Record keeping offering election manager 736 receives the RK participant identifier, RK plan identifier and investment option identifier(s) and stores the RK plan identifier and investment option identifier(s) for each offering election in record keeping participant storage 714 associated with the RK participant identifier.

Additionally, record keeping offering election manager 736 retrieves from record keeping plan storage 712 the BD account identifier associated with the RK plan identifier corresponding to the plan under which the participant's offering election(s) are defined and sends the BD account identifier, RK participant identifier and investment option identifier(s) to broker-dealer account manager 770 with a request to set up one or more broker-dealer subaccounts of the broker-dealer account associated with the BD account identifier, as described above. In one embodiment, record keeping offering election manager 736 may request to set up a different broker-dealer subaccount for each of the investment options elected to by the participant, or record keeping offering election manager 736 may request to set up one broker-dealer subaccount for all of the investment option(s) elected to by the participant, as described above.

Broker-dealer account manager 770 receives such a request from record keeping offering election manager 736, sets up the broker-dealer subaccount(s) as requested, and stores one or more unique broker-dealer subaccount identifier(s) in broker-dealer account storage 772 associated with the received BD account identifier, RK participant identifier and investment option identifier(s).

Broker-dealer account manager 770 sends the unique broker-dealer (BD) subaccount identifier(s) for each investment option to record keeping offering election manager 736 in response to the request to set up the broker-dealer subaccount(s). Record keeping offering election manager 736 receives the BD subaccount identifier(s) and stores the BD subaccount identifier(s) in record keeping participant storage 714 associated with the RK participant identifier, RK plan identifier and investment option identifier(s) corresponding to the investment options for which the BD subaccounts are created.

Additionally, record keeping offering election manager 736 determines if any asset preservation options are included in the investment option election(s). In one embodiment, record keeping offering election manager 736 retrieves asset allocation information from record keeping investment option storage 718 that corresponds to the investment option election(s) received from the user to determine if there are any asset preservation option(s) included in any of the offering election(s). If any investment option elected to by the participant contains an asset preservation option, as described above, record keeping offering election manager 736 determines whether a participant bank account, described above, exists in record keeping participant storage 714 associated with the RK participant identifier and investment option identifier corresponding to the participant and the participant's investment option election which includes the asset preservation option. If there is no participant bank account linked to the RK participant identifier and investment option identifier in record keeping participant storage 714, record keeping offering election manager 736 sends the RK participant identifier, RK plan and investment option identifiers to record keeping bank manager 736 with a request to set up one or more participant bank accounts. In one embodiment, record keeping offering election manager 744 may request to set up more than one participant bank account for the participant, such as a different participant bank account for each investment option elected to by the participant that includes an asset preservation option, according to any asset preservation rules that may apply as described above, or record keeping offering election manager 744 may request to set up one participant bank account for more than one investment option elected to by the participant.

Record keeping bank manager 736 receives the request to set up a participant bank account from record keeping offering election manager 736 and sends a request to bank account manager 780 to set up in the bank computer system an FDIC insured bank account in the participant's name, as described above. In one embodiment, record keeping bank manager 736 retrieves any participant information, such as the participant name, Social Security number, etc., that is necessary to set up an FDIC insured bank account in the participant's name from record keeping participant storage 714, or receives it with the request from record keeping offering election manager 736, and sends the request with the RK participant identifier and RK plan and investment option identifier(s) for which the bank account(s) are set up.

Bank account manager 780 receives the request to set up one or more FDIC insured bank account(s) and the participant information, including the RK participant identifier and RK plan and investment option identifier(s), sets up the FDIC insured bank account(s) as requested in the participant's name, each associated with a unique bank account identifier, and stores the bank account identifier(s) in bank account storage 782 associated with the RK participant identifier and RK plan and investment option identifier(s) for which the request was received. Bank account manager 780 sends the unique bank account identifier(s) stored for the newly created participant bank account(s) back to record keeping bank manager 738 along with the RK participant identifier and investment option identifier(s) that correspond to the participant and investment option(s) for which the FDIC insured bank account(s) are created.

Record keeping bank manager 738 receives the bank account identifier or identifiers from bank account manager 780 and stores the participant bank account identifier(s) in record keeping participant storage 718, each bank account identifier associated with the RK participant identifier, RK plan identifier and investment option identifier for which the bank account identifier was received. The participant may request to elect to any number of investment options at times specified by the rules of the participant's plan, or at any time.

Contributions.

If the participant requests to make a contribution to one or more investment options to which the participant is elected, as described above, such as by clicking a contribution link on the webpage built by record keeping participant user interface manager 732, record keeping contribution rule validator 740 builds a web page containing suitable user interface elements that allow the participant to provide conventional contribution information and returns it to the user's browser in response. The user fills out the web page with the contribution information, such as a contribution amount, RK plan identifier and investment option identifier or identifiers that correspond to the investment option or offerings to which the participant is making a contribution, and any other information needed to make a contribution.

In one embodiment, payroll system 624 of FIG. 6 may request to make the contribution, for example if the participant has set up contributions to be automatically deducted from a regular paycheck as described above. Now referring to FIG. 6, payroll system 624 waits until a contribution time, as described above. When payroll system 624 determines that it is a contribution time, for example, a time in which payroll to a company is made, payroll system 624 identifies a retirement plan contribution amount for each participant at the company scheduled to make a contribution at the contribution time, as described above. Payroll system 624 provides to an account at the bank the identified contribution amounts and provides to record keeping contribution rule validator 740 of FIG. 7 the contribution information described above, including the RK participant identifier corresponding to each identified participant, a contribution amount for each participant, and the corresponding RK plan and investment option identifiers for each participant, as described above. In one embodiment, payroll system 624 retrieves the RK plan and investment option identifiers associated with each participant's RK participant identifier from record keeping participant storage 714. In one embodiment, payroll system 624 provides the request for each contribution it will make for the year when the user sets up such contributions and at the beginning of each year to allow such contributions to be checked for compliances with the plan rules.

Referring again to FIG. 7, consisting of FIGS. 7A, 7B, 7C and 7D, when record keeping contribution rule validator 740 receives contribution information, record keeping contribution rule validator 740 checks the rules of the record keeping plan and investment option(s) to which the contribution is being made to determine if the received contribution complies with all record keeping plan and investment option rules, as described above. Record keeping contribution rule validator 740 may retrieve any plan rules associated with the received RK plan identifier from record keeping plan storage 712 and retrieve any investment option rules associated with the received investment option identifier(s) from record keeping investment option storage 718. In one embodiment, record keeping contribution rule validator 740 may also retrieve other information, as described above, such as any previous records of contributions or other transactions made for the participant, or any other participant information, from record keeping participant account storage 714.

If record keeping contribution rule validator 740 determines that the contribution does not comply with all the plan rules and investment option rules as described above, record keeping contribution rule validator 740 sends an error message to payroll system 624, or record keeping participant user interface manager 732, or both, in response to the request to make the contribution. In one embodiment, record keeping contribution rule validator 740 may deposit any invalid contribution funds into a bank account linked to the RK participant identifier in record keeping participant storage 714 or otherwise hold the invalid contribution funds for the participant in another manner as described above.

If record keeping contribution rule validator 740 determines that the received contribution complies with all plan rules and investment option rules corresponding to the RK plan identifier and investment option identifier(s) received with the contribution, as described above, it sends the contribution information to record keeping deposit manager 742, which receives such information and stores a record of the contribution, including the contribution amount, date and time of the contribution, and the RK plan and investment option identifiers corresponding to the investment options to which the contribution is being made in record keeping participant storage 714 associated with the RK participant identifier for the participant for whom the contribution is being made.

If one or more asset preservation options are included in any of the investment options to which a contribution is being made, record keeping deposit manager 742 uses the asset preservation percentage(s) retrieved with each investment option, as well as any corresponding asset preservation fees that apply, to calculate the cash contribution amount, or amount of funds from the total contribution that is a cash contribution toward an asset preservation option, for each investment option including an asset preservation option, and sends the RK participant identifier and the cash contribution amount or amounts to record keeping bank transaction manager 744, each cash contribution amount associated with its corresponding investment option identifier.

When record keeping bank transaction manager 744 receives the RK participant identifier and cash contribution amount(s) with corresponding investment option identifier(s), it retrieves any participant bank account identifiers associated with the RK participant identifier and each investment option identifier from record keeping participant storage 714. In one embodiment, record keeping bank transaction manager 744 may retrieve different participant bank account identifiers for each investment option identifier and the RK participant identifier in record keeping participant storage 714, or it may retrieve the same participant back account identifier for one or more investment option identifiers and the RK participant identifier. Record keeping bank transaction manager 744 records each cash contribution amount in record keeping participant storage 714 associated with the RK participant identifier and investment option identifier, and record keeping bank transaction manager 744 sends the participant bank account identifier(s) and cash contribution(s) to bank transaction manager 784, which deposits the cash contribution(s) in the correct amount(s) into the FDIC insured bank account(s) in bank account storage 782 that correspond to the participant bank account identifier(s) received from record keeping bank transaction manager 744, as described above.

In one embodiment, prior to any new deposit, record keeping bank transaction manager 744 may retrieve from record keeping participant storage 714 the balance of a bank account and the proportion or bank account percentage of the bank account balance that is allocated to the investment option for which the deposit is being made in order to determine the new bank account percentage of the new bank account balance that is allocated to that investment option after the deposit, as well as the new bank account percentage or percentages for any other investment option(s) to which the bank account is linked. Record keeping bank transaction manager 744 may store the new bank account percentage(s), or bank account allocation, for each bank account that is linked to one or more investment options in record keeping participant storage 714. Record keeping bank transaction manager 744 may retrieve and update bank account allocation information for any number of bank deposits or bank withdrawals at any time.

Record keeping deposit manager 742 retrieves from record keeping investment option storage 718 any asset allocation information, such as any ETF names and corresponding ETF percentages, described above, of ETFs that are included in the investment option and any asset preservation percentages that correspond to each investment option identifier received with the contribution information.

If one or more ETFs are included in any of the investment options to which the contribution is being made, record keeping deposit manager 742 uses the contribution amount and the ETF name(s) and corresponding ETF percentage(s) retrieved with the asset allocation information for each investment option, to calculate one or more ETF contribution amounts, or the amount of contribution funds used to purchase each ETF. Record keeping deposit manager 744 records the ETF contribution amount that corresponds to each ETF in record keeping participant storage 714, including each ETF name and ETF contribution amount associated with the RK participant identifier and investment option identifier for the investment option that includes the ETF. In one embodiment, record keeping deposit manager 744 may determine the ETF contribution amount corresponding to an ETF as an amount of funds, such as a dollar amount, with which to purchase the ETF, or as the number of shares of the ETF to purchase. To determine the ETF contribution amount as the number of shares of the ETF to purchase, record keeping deposit manager 744 may request and receive a real-time, or near real-time, quote for the current price-per-share of the ETF to purchase from quotation system (not shown) as described above.

Record keeping deposit manager 744 also retrieves from record keeping plan storage 712 the BD account identifier that is linked to the RK plan identifier corresponding to the plan under which the participant is buying investment option shares and sends the ETF contribution information, including each ETF name, corresponding ETF contribution amount and investment option identifier for each investment option which includes the ETF, to record keeping ETF purchase manager 746 along with the BD account identifier and RK participant identifier.

Record keeping ETF purchase manager 746 receives the BD account identifier, RK participant identifier and ETF contribution information, and retrieves from record keeping participant storage 714 any BD subaccount identifier(s) associated with the received BD account identifier and RK participant identifier and each investment option identifier received. Record keeping ETF purchase manager 746 sends one or more ETF transaction requests, each request including an ETF name, its corresponding ETF contribution amount and corresponding BD subaccount identifier to broker-dealer transaction manager 774.

When broker-dealer transaction manager 774 receives one or more transaction requests from record keeping ETF purchase manager 746, broker-dealer transaction manager 774 purchases the requested ETFs in the requested amounts, and records each ETF transaction in broker-dealer account storage 772.

In one embodiment, if payroll system 624 or record keeping participant user interface manager 732 retrieve or receive no investment option elections corresponding to the RK participant identifier, then an investment option election may be provided to record keeping contribution rule validator 740 as an investment option that allocates %100 of contribution funds to an asset preservation option, and record keeping bank deposit manager 744 may deposit the contribution funds into an FDIC insured bank account associated with the RK participant identifier in record keeping participant storage 714. In one embodiment, if no FDIC insured bank account is associated with the RK participant identifier, or if no proper FDIC insured bank account is associated with the RK participant identifier as described above, in record keeping participant storage 714, bank account manager 770 may first set up a proper FDIC insured bank account for the RK participant identifier in the manner described above.

If the participant, or another user, requests to withdraw funds (sell shares) from a retirement plan according to the rules of the plan and the investment options from which the funds are being withdrawn (i.e. the rules of the plan and investment options of which shares are being sold), such as by clicking a withdraw funds link, or a sell shares link, on the webpage provided by record keeping participant user interface manager 732, record keeping sell rule validator 748 builds a web page containing suitable user interface elements that allow the user to provide funds withdrawal information, described above, and returns it to the user's browser in response. The user fills out the web page with the funds withdrawal information, such as the reason for the withdrawal, the number of shares of one or more investment options to sell or the amount of funds to be withdrawn, the investment option(s) from which to sell the shares, the record keeping plan under which the investment option shares being sold are defined, and any deposit information, such as a bank account in which to deposit funds received from the sold shares (i.e. withdrawn funds), as described above. In one embodiment, the investment option(s) from which to sell shares and the record keeping plan under which the investment option(s) being sold are defined may be provided by the user as the RK plan identifier and investment option identifier(s) described above, and the deposit information may be provided as a bank account identifier and corresponding routing number or bank name for the account into which the user would like the withdrawn funds to be deposited. Record keeping sell rule validator 748 receives the funds withdrawal information and checks the plan rules and investment option(s) rules to determine if the funds withdrawal complies with all such rules and any other rules applying to fund withdrawals, as described above. To determine if the funds withdrawal request complies with all such rules, record keeping sell rule validator 748 retrieves from record keeping plan storage 712 any plan rules corresponding to the RK plan identifier received, retrieves from record keeping investment option storage 718 any investment option rules corresponding to the received investment option identifier(s), and retrieves from record keeping participant storage 716 any previously provided participant information corresponding to the participant's RK participant identifier, such as the participant's date of birth, or any other information corresponding to the RK participant identifier, such as any previous transaction or funds withdrawal records or any other records, such as records corresponding to the number of shares owned by the participant of any investment option. For example, in addition to checking participant information and plan and investment option rules to determine whether the participant is eligible to sell shares of an investment option, record keeping sell rule validator 748 may retrieve transaction records or participant account records corresponding to the RK participant identifier to determine whether the participant owns at least the number of shares of the investment option that are requested to be sold.

If record keeping sell rule validator 748 determines that the funds withdrawal complies with all plan rules and investment option rules and all other rules applying to fund withdrawals and the selling of shares, as described above, record keeping sell rule validator 748 sends the funds withdrawal information, including the reason for the withdrawal, the number of shares to sell, the RK plan and investment option identifiers corresponding to the investment option(s) of which to sell shares, the deposit account into which any withdrawn funds are to be deposited (i.e. the manner in which the funds will be provided to the participant), and the RK participant identifier corresponding to the account for which the funds are being withdrawn to record keeping sell manager 750.

Record keeping sell manager 750 receives such funds withdrawal information from record keeping sell rule validator 748 and stores a record of the funds withdrawal information with the date and time of the withdrawal in record keeping participant storage 714.

Record keeping sell manager 750 identifies the type or types of assets that are included in the investment option(s) from which shares are being sold, as well as the allocation corresponding to each type of asset, described above. To identify the type or types of assets to be sold, record keeping sell manager 750 retrieves from record keeping investment option storage 718 any asset allocation information associated with the investment option identifier(s) received, including the ETF name and corresponding ETF percentage for any ETFs included in the investment option(s), as well as any asset preservation options that may be included in the investment option(s).

Using the asset allocation information and the number of investment option shares to sell, record keeping sell manager 750 identifies the number of shares to sell of each ETF included in the investment option(s) of which shares are being sold, as described above. In one embodiment, if record keeping sell manager 750 receives an amount of funds to be withdrawn, such as a dollar amount, rather than a number of shares of one or more investment options to sell, record keeping sell manager 750 may obtain the real-time pricing, or a near real-time pricing, of the ETFs to sell, as described above, from a quotation system (not shown) in order to compute the number of shares of each ETF to sell in a conventional manner.

When record keeping sell manager 750 has determined the number of shares to sell of each ETF in each investment option, record keeping sell manager 750 adds it to the funds withdrawal information, along with the date and time, in record keeping participant storage 714, and record keeping sell manager 750 sends the ETF sell information, including each ETF name and the number of shares of each ETF to sell, to record keeping ETF sell manager 754 along with the RK participant identifier for whom the shares are being sold and the RK plan and investment option identifiers of which the shares are being sold.

Record keeping ETF sell manager 754 receives such ETF sell information, RK participant identifier and RK plan and investment option identifiers and retrieves from record keeping participant storage 714 the BD subaccount identifier(s) associated with the RK participant, RK plan and investment option identifiers. In one embodiment, if the BD subaccount set up for one investment option to which the participant is elected is different from the BD subaccount linked to another investment option to which the participant has elected, then record keeping ETF sell manager 754 may retrieve more than one BD subaccount identifier for the participant. Record keeping ETF sell manager 754 sends each BD subaccount identifier with each corresponding ETF name and calculated number of shares of each ETF to sell to BD transaction manager 774. In one embodiment, record keeping ETF sell manager 754 may also retrieve from record keeping participant storage 714 the participant bank account identifier(s) for the FDIC insured bank account(s) associated with the RK participant identifier, RK plan identifier and each investment option identifier, and sends the participant bank account identifier(s) to RK ETF sell manager 754 with the ETF sell information above.

BD transaction manager 774 receives the BD subaccount identifier, ETF name(s) with corresponding number of ETF shares to sell, and participant bank account information and complies with the request to sell such ETF shares from the BD subaccount as described above. In one embodiment, BD transaction manager 774 provides funds from the ETF sales to the FDIC insured bank account specified by the bank account identifier, as described above.

Record keeping sell manager 750 also identifies, as described above, any asset preservation option(s) in the investment option information retrieved above and, if one or more asset preservation options are identified, record keeping sell manager 750 determines the cash withdrawal amount that corresponds to each asset preservation option included in the investment option shares to be sold, and records each cash withdrawal amount in record keeping participant storage 714 associated with the RK participant identifier and RK plan and investment option identifier(s) to which the cash withdrawal amount(s) correspond. In one embodiment, record keeping sell manager 750 may determine the cash withdrawal amount that corresponds to an investment option as an amount of funds, such as a dollar amount, or as a bank account percentage, such as the number of shares of the investment option corresponding to the asset preservation option being sold out of the total number of shares of that investment option held by the participant.

When record keep sell manager 750 has identified and stored the cash withdrawal and ETF sell information for all investment option(s) from which funds are being withdrawn, record keeping sell manager 750 sends bank funds withdrawal information, including the cash withdrawal and ETF sell information, the RK plan and investment option identifiers corresponding to the investment options of which shares are being sold, the RK participant identifier for whom such funds are withdrawn and the deposit account information for the account into which withdrawn funds are to be deposited (i.e. destination account for withdrawn funds), to record keeping bank transaction manager 744.

Record keeping bank transaction manager 744 receives the bank funds withdrawal information and retrieves from record keeping participant storage 714 the bank account identifier(s) associated with the received RK participant identifier, RK plan and each investment option identifier corresponding to the investment option(s) of which shares are being sold. Record keeping bank transaction manager 744 sends bank funds withdrawal information with corresponding participant bank account identifier to bank transaction manager 784, along with the deposit account information, and bank transaction manager 784 receives such information.

In one embodiment, record keeping bank transaction manager 744 may retrieve from record keeping participant storage 714 bank account allocation information, described above, for each bank account retrieved, and record keeping bank transaction manager 744 may calculate new bank account allocation among different investment options for any bank account from which funds are withdrawn and store any updated bank account allocation information in record keeping participant storage 714.

Bank transaction manager 784 withdraws the requested amount of funds out of the bank account(s) as requested, deposits the bank funds into the designated participant bank account corresponding to the received deposit account information in a conventional manner, and stores a record of such transaction(s) in bank account storage 782. In one embodiment, bank transaction manager 784 may provide the withdrawn funds to the user via a deposit into the participant's bank account as described above, or bank transaction manager 784 may provide the withdrawn funds via a check made out and mailed to the participant or any other manner in which funds may be provided to a participant.

If the participant requests to change one or more of the investment options to which the participant has elected, or transfer funds between any such investment options, such as by clicking a change investment options link or a transfer funds link on the webpage provided by record keeping participant user interface manager 732, record keeping change rule validator 756 builds a web page containing suitable user interface elements that allow the user to provide funds transfer information, and returns it to the user's browser in response. Changing from one plan to a different plan is a complete transfer of funds from one investment option to another to which the user has elected as described above. The user fills out the web page with the funds transfer information, such as the RK participant identifier corresponding to the participant account for which to transfer funds, the amount of funds to transfer, the investment option or offerings from which the funds should be withdrawn and the investment option or investment options to which the funds should be invested, as described above, and any other information required to transfer funds. In one embodiment, the user provides the amount of funds to transfer as a funds amount, such as a dollar amount, or as the number of shares that the user wishes to sell of the old investment option(s).

Record keeping change rule validator 756 receives the funds transfer information and checks plan rules and investment option rules for investment option(s), including rules for all investment options to which, and from which, the funds are being transferred, to determine if the funds transfer request complies with all such rules and any other rules applying to fund transfers, as described above. To determine if the funds transfer request complies with all such rules, record keeping change rule validator 756 retrieves from record keeping plan storage 712 any plan rules corresponding to the RK plan identifier received, retrieves from record keeping investment option storage 718 any investment option rules corresponding to the received investment option identifier(s), and retrieves from record keeping participant storage 716 any participant information corresponding to the received RK participant identifier, such as the participant's date of birth, or any other information corresponding to the RK participant identifier, such as any previous transaction records.

If record keeping change rule validator 756 determines that the funds transfer request complies with all plan rules and investment option rules and all other rules applying to fund transfers and the buying and selling of shares, as described above, record keeping change rule validator 756 sends the funds transfer information, including the amount of funds to transfer (or number of shares of old investment option(s) to sell), the RK plan and investment option identifiers corresponding to the investment options to and from which to transfer funds, and the RK participant identifier corresponding to the participant account for which the funds are being transferred to record keeping change manager 758.

Record keeping change manager 758 receives the funds transfer information and identifies ETFs that are included in the old investment option(s) from which shares are being sold but not included in the new investment option(s) from which shares are being purchased, as well as the allocation corresponding to each such ETF to sell. Record keeping change manager 758 may also identify as ETFs to sell any ETFs that are included in both the old and new investment options, but with a lower allocation in the new investment option than in the old investment option (i.e. fewer shares of the ETF in the new investment option being bought than in the old investment option being sold). To identify such ETFs to sell, record keeping change manager 758 retrieves from record keeping investment option storage 718 any asset allocation information associated with the investment option identifier(s) corresponding to old investment options, including the ETF name and corresponding ETF percentage for any ETFs included in the old investment option(s), as well as any asset allocation information associated with the investment option identifier(s) corresponding to new investment option(s).

Using the asset allocation information and the number of investment option shares to sell, record keeping change manager 758 computes the number of shares to sell of each ETF identified as an ETF to sell. In one embodiment, if record keeping change manager 758 receives an amount of funds to transfer rather than a number of shares to transfer, record keeping change manager 758 may obtain the current pricing, or an estimate of the current pricing, of the ETFs to sell from a quotation system (not shown) in order to compute the number of shares of each ETF to sell. For an ETF that is included in both the new and old investment options, as described above, record keeping change manager 758 may compute the number of shares to sell of such an ETF as the number of shares allocated in the old investment option(s) minus the number of shares allocated to the same ETF in the new investment option(s).

When record keeping change manager 758 has determined the number of shares to sell of each ETF in each investment option, record keeping change manager 758 stores a record of such ETF sell information, along with the date and time, in record keeping participant storage 714 associated with the RK participant identifier for whom the ETF shares are being sold and the RK plan and investment option identifier(s) for which the ETF shares are being sold, and record keeping change manager 758 sends the ETF sell information, including each ETF name and the number of shares of each ETF to sell, to record keeping ETF sell manager 754 along with the RK participant identifier for whom the shares are being sold and the RK plan and investment option identifiers of which the shares are being sold. In one embodiment, record keeping change manager 758 may send the deposit account information for the participant account into which withdrawn funds are to be deposited as the FDIC insured bank account(s) linked to the RK participant identifier and RK plan and investment option identifiers(s) for the investment option(s) being sold in record keeping participant storage 714.

Record keeping ETF sell manager 754 and broker-dealer transaction manager 774 operate in the manner described above to sell ETF shares using the participant's broker-dealer subaccount, and broker-dealer transaction manager 774 deposits the withdrawn funds from the sale of ETFs into the participant FDIC insured bank account, designated as the deposit account for the withdrawn funds by record keeping change manager 758, as described above.

Using the asset allocation information retrieved above for the old investment option shares being sold and the new investment option(s) shares being purchased, record keeping change manager 758 determines whether the investment option of which shares are being sold has an asset preservation option, and if so, whether funds from such asset preservation option(s) are needed for the purchase of ETF shares in the new plan (for example, funds are not needed if the percentage allocated to the asset preservation option are higher in the new investment option than the old investment option).

If record keeping change manager 758 determines that funds from an asset preservation option are needed for the purchase of ETF shares, as described above, it identifies the excess cash amount or amounts that correspond to each asset preservation option, as described above, and determines the total amount of funds available to purchase ETF shares of the new investment option, such as the sum of funds withdrawn from the sale of ETFs above with any excess cash funds identified. Record keeping change manager 758 then determines the number of shares of the new investment option to purchase, and stores the number of shares to be purchased in record keeping participant storage 714 along with the RK participant identifier, and RK plan and investment option identifiers for which the shares are being purchased.

Using the number of new investment option shares to purchase and the asset allocation information corresponding to the new investment option(s) being purchased, record keeping change manager 758 also identifies the ETFs that are to be purchased as well as the corresponding number of ETF shares of each ETF to purchase, stores such information in record keeping participant storage 714, and sends the ETF purchase information to record keeping ETF purchase manager 746.

Record keeping ETF purchase manager 746 receives such information, and record keeping ETF purchase manager 746 and broker-dealer transaction manager 774 operate in the manner described above to purchase ETFs using the participant's broker-dealer subaccount.

As described above, if the number of ETF shares of any ETF from any investment option(s) that are being sold is the same as the number of ETF shares of the same ETF in any new investment option(s) being bought (i.e. ETFs and ETF shares that are not identified as ETFs to sell as described above), then record keeping change manager 758 may transfer such ETF shares of such ETFs, as described above. In one embodiment, to transfer such ETF shares, record keeping change manager 758 records in record keeping participant storage 714 the investment option identifier(s) for the new investment options to which the participant has transferred funds.

If record keeping change manager 758 determines that the amount of funds withdrawn from any asset preservation option above or sale of ETFs above, or both, exceeds the amount of funds used to purchase ETFs above, then record keeping change manager 758 sends the excess funds amount to record keeping bank transaction manager 744 along with the RK participant identifier and RK plan and investment option identifiers corresponding to the investment option(s) to which funds are being transferred. Record keeping bank transaction manager 744 receives such information and retrieves the bank account identifier associated with the received RK participant identifier from record keeping participant storage 714. Record keeping bank transaction manager 744 stores the excess funds amount in record keeping participant storage 714, associated with the retrieved bank account identifier, and sends the excess funds and the retrieved bank account identifier to bank transaction manager 784.

Bank transaction manager 784 receives the excess funds and bank account identifier, deposits the excess funds into the account associated with the bank account identifier and stores the transaction information in bank account storage 782 associated with the bank account identifier received.

If the participant requests to see the amount of funds held in the participant's retirement accounts, such as by clicking a check balance link on the webpage provided by record keeping participant user interface manager 732, record keeping balance manager 760 receives the request and determines the type or types of assets, and the number of shares of each asset type, included in the participant's retirement fund. In one embodiment, the participant or user interface manager 732 (via a cookie when a participant logs in) may provide the RK participant identifier corresponding to the participant account for which the balance is requested. Record keeping balance manager 760 retrieves participant account information associated with the RK participant identifier from record keeping participant storage 714, including the RK plan identifier and one or more investment option identifiers corresponding to the investment option(s) that the participant has elected, as described above. Record keeping balance manager 760 then retrieves from record keeping investment option storage 718 the asset allocation information corresponding to the investment option identifier(s) retrieved from record keeping participant storage 716 to identify the type or types of assets included in the participant's retirement account.

If record keeping balance manager 760 identifies one or more ETFs in the retrieved asset allocation information, it identifies the number of shares owned by the participant of each ETF and obtains a real-time, or near real-time, quote on the price of each ETF owned by the participant from a conventional third-party quotation system (not shown) in order to determine the total value of ETF shares held by the participant in the participant's retirement fund. For each ETF identified in the asset allocation information, record keeping balance manager 760 identifies the investment option or offerings which include the ETF, the corresponding ETF percentage, and the number of shares of each investment option including the ETF that are held by the participant. Record keeping balance manager 760 multiplies the ETF percentage corresponding to the ETF times the number of shares held by the participant of the investment option which includes that ETF percentage to determine the number of shares of the ETF that are owned by the participant. Record keeping balance manager 760 also requests and receives the real-time, or near real-time, estimate of the price of the ETF from such quotation system (not shown) as described above, and multiplies the number of shares of the ETF owned times the price-per-share of the ETF to determine the amount of funds invested in the ETF. For example, if ETF Alpha is allocated as 50% of investment option B, and the participant owns 100 shares of investment option B, then record keeping balance manager 760 multiplies 50% times 100 to determine that the participant owns 50 shares of ETF Alpha. If ETF Alpha is priced at 3 dollars per share, then record keeping balance manager 760 determines that 3 dollars per share times 50 shares equals 150 dollars that are invested by the participant in ETF Alpha. Record keeping balance manager 760 computes the amount of funds invested in every ETF identified in the asset allocation information above to determine the total amount of funds invested in ETFs.

If record keeping balance manager 760 identifies one or more asset preservation options included in the retrieved asset allocation information, record keeping balance manager 760 identifies the amount of bank funds that are associated with each asset preservation option. In one embodiment, record keeping balance manager 760 identifies the bank funds associated with an asset preservation option by identifying the FDIC insured bank account that is associated with the investment option that includes the asset preservation option, as well as the bank account allocation corresponding to each identified bank account for every investment option identifier in record keeping participant storage 714. Record keeping balance manager 760 identifies the total amount of bank funds that are associated with any asset preservation options owned by the participant and sums the total bank funds with the total amount of funds invested in ETFs, identified above, to determine the total amount of funds invested in the participant's retirement plan. When record keeping balance manager 760 has determined the total amount of funds invested in the participant's retirement fund, it sends the fund balance to record keeping participant user interface manager 732, which displays the fund balance to the user in a conventional manner.

Record keeping ETF purchase manager 746 and record keeping ETF sell manager 754 as well as the Broker dealer transaction manager 774 utilize the pool of shares used to handle fractional shares as described herein. The amounts in the pool may be stored in BD account storage 772 and in RK plan storage. In one embodiment, BD transaction manager 774 maintains the requisite number of shares of each fund as described above via its account with the bank, and it notifies record keeping purchase manager 746 when such purchases or sales for the pool are made, and record keeping purchase manager 746 updates the information regarding amounts held by the pool in record keeping plan storage 712.

In one embodiment, RK bank manager 738 withdraws funds from the bank accounts of the participants or the bank accounts of the plans or the bank account for all plans and pays fees incurred. Fees may be per participant and need not correspond to the amount of assets held, though they could in other embodiments. The fees may be paid to the asset allocator for performing the asset allocations, or other service providers, though such fees may be paid by the plan sponsor in other embodiment. The fees may be any or all of a one-time fee, or a recurring fee. The fees may be measured in any conventional manner of assessing fees against an investor.

Any number of participants from any number of companies having one or more retirement plans having any number of investment options may be used by the present invention.

What is claimed is:

1. A method of operating a retirement plan, the method comprising:
providing to an asset allocator identifiers of a plurality of non-actively managed funds from which to choose to create a plurality of investment options;
receiving from the asset allocator, for each of the plurality of investment options, the identifiers of at least one non-actively managed fund to correspond to said investment option for the retirement plan;
identifying at least one of the plurality of investment options for each of a plurality of participants in the retirement plan;
receiving funds that are to be, or have been, contributed to the retirement plan on behalf of each of the plurality of participants; and
purchasing by a computer processor coupled to a memory, at least one non actively managed fund responsive to the funds received, via a plurality of subaccounts of a retirement plan account of the retirement plan at a broker dealer, each of the plurality of subaccounts of the retirement plan account corresponding to a different one of the plurality of participants.

2. The method of claim 1:
wherein at least one of the plurality of investment options comprises an asset protection option; and
the method additionally comprises depositing at least some of the funds received in at least one account at an insured financial institution.

3. The method of claim 2 wherein the financial institution is a bank.

4. The method of claim 2, wherein the plan account at the broker dealer is held by the financial institution for the benefit of the retirement plan.

5. The method of claim 2, wherein the at least one account comprises at least one account for each of the plurality of participants.

6. The method of claim 5, additionally comprising identifying a balance of one of the plurality of plan participants responsive to a number of shares of the at least one non-actively managed fund held in the subaccount of said plan participant, an amount of funds deposited in said plan participant's insured account at the financial institution, and at least one substantially real time quotation for at least one of the at least one non-actively managed fund held in the subaccount of said plan participant.

7. A computer program product comprising a computer useable medium having computer readable program code embodied therein for operating a retirement plan, the computer program product comprising computer readable program code devices configured to cause a computer system to:

provide to an asset allocator identifiers of a plurality of non-actively managed funds from which to choose to create a plurality of investment options;

receive from the asset allocator, for each of the plurality of investment options, the identifiers of at least one non-actively managed fund to correspond to said investment option for the retirement plan;

identify at least one of the plurality of investment options for each of a plurality of participants in the retirement plan;

receive funds that are to be, or have been, contributed to the retirement plan on behalf of each of the plurality of participants; and at least initiate, by a computer processor coupled to a memory, a purchase at least one non actively managed fund responsive to the funds received, via a plurality of subaccounts of a retirement plan account of the retirement plan at a broker dealer, each of the plurality of subaccounts of the retirement plan account corresponding to a different one of the plurality of participants.

8. The computer program product of claim 7:

wherein at least one of the plurality of investment options comprises an asset protection option; and the computer program product additionally comprises computer readable program code devices configured to cause the computer system to deposit at least some of the funds received in at least one account at an insured financial institution.

9. The computer program product of claim 8 wherein the financial institution is a bank.

10. The computer program product of claim 8, wherein the plan account at the broker dealer is held by the financial institution for the benefit of the retirement plan.

11. The computer program product of claim 8, wherein the at least one account comprises at least one account for each of the plurality of participants.

12. The computer program product of claim 11, additionally comprising computer readable program code devices configured to cause the computer system to identify a balance of one of the plurality of plan participants responsive to a number of shares of the at least one non-actively managed fund held in the subaccount of said plan participant, an amount of funds deposited in said plan participant's insured account at the financial institution, and at least one substantially real time quotation for at least one of the at least one non-actively managed fund held in the subaccount of said plan participant.

* * * * *